United States Patent
Teramae et al.

[11] Patent Number: 5,984,065
[45] Date of Patent: Nov. 16, 1999

[54] LOCKUP DAMPER FOR TORQUE CONVERTER

[75] Inventors: Hiroshi Teramae; Shinji Fujimoto; Koji Kajitani; Hiroshi Mizukami, all of Neyagawa, Japan

[73] Assignee: EXEDY Corporation, Neyagawa, Japan

[21] Appl. No.: 08/985,778

[22] Filed: Dec. 5, 1997

[30] Foreign Application Priority Data

| Dec. 6, 1996 | [JP] | Japan | 8-326978 |
| Feb. 25, 1997 | [JP] | Japan | 9-041050 |

[51] Int. Cl.⁶ .................................................. F16D 33/00
[52] U.S. Cl. ................................... 192/3.28; 192/205
[58] Field of Search ................... 192/3.28, 205, 192/3.29

[56] References Cited

U.S. PATENT DOCUMENTS

| 2,321,941 | 6/1943 | Rose | 192/205 X |
| 4,413,711 | 11/1983 | Lamarche | 192/3.28 |
| 4,875,562 | 10/1989 | Fujimoto | 192/3.28 |
| 4,890,706 | 1/1990 | Miura et al. | 192/3.28 |
| 4,903,803 | 2/1990 | Koshimo | 192/3.28 |
| 4,987,980 | 1/1991 | Fujimoto | 192/3.28 |
| 5,032,107 | 7/1991 | Umeyama et al. | 192/205 X |
| 5,273,372 | 12/1993 | Friedmann et al. | 192/205 X |
| 5,868,228 | 2/1999 | Fukushima | 192/3.29 |

FOREIGN PATENT DOCUMENTS

| 19748900 | 5/1998 | Germany . | |
| 248752 | 10/1990 | Japan | 192/3.28 |

*Primary Examiner*—Charles A Marmor
*Assistant Examiner*—Ha Ho
*Attorney, Agent, or Firm*—Shinjyu An Intellectual Property Firm

[57] ABSTRACT

A lockup damper has a drive plate 3 and a driven plate 5 and a first coil spring 7 disposed between the plates 3 and 5, a second coil spring 8 disposed between the two plates 3 and 5 and the first coil spring 7, and an intermediate plate 4 having a support portion 21 and first and second intermediate limit portions 22a and 22b. The intermediate support portion 21 is disposed between the two coil springs 7 and 8 for supporting the springs in the circumferential direction. The first and second intermediate limit portions 22a and 22b extend in interiors of the first and second coil springs 7 and 8 from the intermediate support portion 21 for limiting the radially outward movement of the first and second coil springs 7 and 8.

12 Claims, 14 Drawing Sheets

LOCKUP DAMPER FOR TORQUE CONVERTER

BACKGROUND OF THE INVENTION

1. Field of the Invention

The present invention relates to a lockup damper in a lockup mechanism of a torque convertor, the lockup damper for absorbing and attenuating vibrations transmitted from an input rotary member to an output rotary member.

2. Description of the Related Art

In general, a damper mechanism absorbs and attenuates the vibration transmitted from an input rotary member to an output member while transferring the torque from the input rotary member to the output rotary member. For instance, as an example of the damper mechanism, a damper (hereinafter referred to as a lockup damper) is included in a lockup mechanism disposed in an interior of a torque convertor.

The torque convertor is an apparatus having three types of blade impeller members, an impeller, a turbine and a stator in an interior of the torque convertor for transmitting the torque via a working oil contained in the interior of the torque convertor. The impeller is fixed to a front cover of the torque convertor. Torque is inputted via the front cover from, for instance, an internal combustion engine. The toque is transmitted from the impeller to the turbine by the working oil as the working oil flows from the impeller to the turbine. The working oil then passes through the stator and returns to the impeller. The turbine is connected to a main drive shaft of a transmission and thus the torque is transmitted from the turbine to the transmission.

The lockup mechanism is disposed between the front cover (input rotary member) and the turbine (output rotary member) for selectively mechanically connecting the front cover and the turbine with each other to directly transmit the torque without use of the intervening working oil.

In general, the lockup mechanism includes a piston member that may be pressed against the front cover, a drive member fixed to the piston member, a coil spring supported on the drive member, and a driven member elastically connected with the piston member in the rotational direction via the coil spring. The driven member is fixed to the turbine. The components that form the lockup mechanism constitute the lockup damper for absorbing and attenuating the vibrations that have been received.

When the lockup mechanism operates, the piston member slides along a surface of the front cover or in pressure contact with the surface of the front cover. The torque is transmitted from the front cover to the piston member and further transmitted to the turbine through the coil springs. At this time, the lockup mechanism transfers the torque and at the same time absorbs and attenuates the twist vibrations by the lockup damper. In this case, the coil springs are repeatedly compressed and expand between the drive member and the driven member to thereby absorb and attenuate the twist vibrations.

Recently, in many configurations, in order to reduce an axial dimension of the torque convertor, the lockup damper has been configured with coil springs disposed on an outer circumferential portion of the torque convertor where a relatively large extra space is otherwise unoccupied. However, if the coil springs are arranged around the torque convertor, an angle at which the lockup damper may be twisted is smaller than that of the case where the coil springs are disposed in a radially interior portion or the intermediate portion. In other words, if the coil springs used at a radially inner position are then used at a radially outer position but have the same dimensions, the relative displacement angle possible between the input rotary member and the output rotary member is smaller. As a result, the twist angle of the lockup damper is narrowed so that, in particular, the absorption of twist vibrations in the low RPM region of the engine is reduced.

In order to solve this problem, it is proposed that two coil springs be connected in series with each other through an intermediate member or the like. The circumferential dimensions of the compressible coil springs connected in series with each other is such that it is possible to maintain and possibly increase predetermined angle of relative rotary displacement between the input and output members. Also, if two elastic members having different spring constants are combined in series, it is possible to enhance the twist characteristics of the lockup damper by providing two stage characteristics or the like.

However, if the coil springs are arranged on the outer circumferential portion of the torque convertor as described above, a phenomenon occurs in which a large centrifugal force effects the performance from coil springs. Namely, since a larger centrifugal force than that in the case where the coil springs are arranged in, for example, the radial intermediate portion, may be applied to the coil springs in the operation of the torque convertor, the coil springs are moved radially outwardly, and there is a possibility that the frictional resistance will occur between the coil springs and adjacent members disposed radially outwardly of the coil springs. If the frictional resistance between the coil springs and the other components is increased, it is impossible to sufficiently absorb the twist vibrations.

Also, in the above-described lockup damper, it is necessary to provide a stopper mechanism for limiting the relative rotation to prevent the relative rotary displacement from exceeding a predetermined angle between the drive member nd the driven member. Namely, when the torque that exceeds a certain level is transmitted, the stopper mechanism works and the relative rotation between the drive member and the driven member exceeding the predetermined angle must be prohibited. It may be proposed that, as the stopper mechanism, for example, the coil springs are used so that they are in intimate contact with each other, and the intimately contacted coil springs are used as the stopper mechanism.

However, if the coil springs are thus used as the stopper mechanism, it is necessary to use coil springs which have the sufficient durable strength against the maximum torque load to be transferred, and therefore the range of selection of the coil spring is narrowed. Therefore, the damper characteristics are limited or the cost for the coil springs are increased. In particular, recently, it is desired that the durability of the lockup mechanism be enhanced. Therefore, it is necessary to reduce the load to be imposed to the coil springs. On the other hand, in the case where the coil springs are not used as the stopper mechanism, it is necessary to provide a discrete stopper mechanism. However, if the stopper mechanism is provided discretely, the number of mechanical parts and the number of the working steps to assemble are increased thus increasing the manufacture cost and possibly enlarging the lockup mechanism.

Also, when using two elastic members in series with one another, it is necessary to employ an intermediate member, that may connect the elastic members to each other. In this configuration it is very difficult to stabilize the joint portion between the two elastic member as defined by the intermediate member. For this reason, in repeating expansion and compression of the elastic members, the joint portion is moved radially outwardly, or otherwise in the axial direction of the torque convertor, so that there is a fear that the joint portion will also interfere with or slide along other components to generate an extra frictional resistance. Thus, it is difficult to attain stable damper characteristics in such a lockup damper.

SUMMARY OF THE INVENTION

An object of the present invention is to provide a lockup damper for a torque convertor having elastic members connected in series with each other, in which radially outward movement of the elastic members is limited to reduce a frictional resistance between the elastic members and radially outward adjacent members.

Another object of the present invention is to provide a lockup damper for a torque convertor, in which a stopper mechanism for reducing a load to be imposed on the elastic members while suppressing increases of manufacturing costs is provided so that a selection range of materials for the elastic members is broadened to facilitate the setting of the twist characteristics in response to the requirement of a vehicle.

Still another object of the present invention is to provide a lockup damper for a torque convertor in which two or more elastic members connected in series with each other through an intermediate member for maintaining wide twist characteristics, in which the movement of the joint portion of the elastic members including the intermediate member is limited to stabilize the damper characteristics.

In accordance with a first aspect of the present invention, a lockup damper is included in a lockup mechanism of a torque convertor. The lockup damper is for mechanically transmitting torque from an input rotary member to an output rotary member and for absorbing and attenuating vibrations transmitted from the input rotary member to the output rotary member. The lockup damper includes an input member selectively engagable with an input rotary member. The lockup damper also includes an output member connected to an output rotary member of a torque convertor. A first coil spring is functionally disposed between the input member and the output member. A second coil spring is functionally disposed between the first coil spring and the output member. An intermediate member is formed with an intermediate support portion extending between the first coil spring and the second coil spring for contacting each of the first coil spring and the second coil spring in a circumferential direction. The intermediate member has an intermediate limit portion extending from the intermediate support portion into an interior of at least one of the first and the second coil springs for limiting a radially outward movement of at least one of the first and the second coil springs.

Preferably, the intermediate limit portion extends from the intermediate support portion into at least a mid-portion of one of the first coil spring and the second coil spring with respect to a circumferential direction of the torque convertor.

Preferably, the second coil spring has a rigidity lower than the first coil spring and the intermediate limit portion extends into the second coil spring. The intermediate limit portion is formed with a circumferential length such that in response to compression of the second coil spring beyond a predetermined limit, a distal end of the intermediate limit portion engages a portion of at least one of the input member and the output member thus limiting compression of the second coil spring.

Preferably, the intermediate limit portion includes a first intermediate limit portion and a second intermediate limit portion. The first intermediate limit portion extending into the first coil spring and the second intermediate limit portion extending into the second coil spring. The first intermediate limit portion is formed with a circumferential length such that in response to compression of the first coil spring beyond a predetermined limit, a distal end of the first intermediate limit portion engages a portion of at least one of the input member and the output member thus limiting compression of the first coil spring. The second intermediate limit portion is formed with a circumferential length such that in response to compression of the second coil spring beyond a predetermined limit, a distal end of the second intermediate limit portion engages a portion of at least one of the input member and the output member thus limiting compression of the second coil spring.

Preferably, the torque convertor and lockup damper have a forward rotational direction and a reverse rotational direction. The first coil spring is disposed on a forward rotational direction side of the second coil spring. The intermediate support portion is disposed between a reverse rotational direction side of the first coil spring and the forward rotational direction side of the second coil spring. The input member includes an input support portion for supporting, in the circumferential direction, a forward rotational direction side of the first coil spring and a reverse rotational direction side of the second coil spring. The output member includes an output support portion for supporting, in the circumferential direction, the forward rotational direction side of the first coil spring and the reverse rotational direction side of the second coil spring. Seat members are mounted on the forward rotational direction side of the first coil spring and the reverse rotational direction side of the second coil spring. Further, in response to compression of the first and second coil springs beyond the predetermined limit, the intermediate limit portion mechanically engages a corresponding one of the seat members.

Preferably, a plurality of the first and second coil springs and a plurality the intermediate support portions are provided in the torque convertor extending in a circumferential direction therein. The intermediate member defines a joint portion for structurally connecting the plurality of intermediate support portions with each other.

In accordance with another aspect of the present invention, a lockup damper is included in a lockup mechanism for a torque convertor for mechanically transmitting torque from an input rotary member to an output rotary member and for absorbing and attenuating vibrations transmitted from the input rotary member to the output rotary member. The lockup damper includes an input member selectively engagable with an input rotary member and an output member connected to an output rotary member of a torque convertor. A first coil spring and a second coil spring are functionally disposed between the input member and the output member on an outer circumferential portion of the torque convertor and connected in series with each other for elastically coupling the input member and the output member with each other in a rotational direction. An intermediate member is formed with an intermediate support portion extending between the first coil spring and the second coil spring for contacting each of the first coil spring and the second coil spring in a circumferential direction. The intermediate member has an intermediate limit portion extending from the intermediate support portion into an interior of at least one of the first and the second coil springs for limiting a radially outward movement of at least one of the first and the second coil springs. An axial direction limit member is disposed adjacent to the intermediate member to limit movement of the intermediate member in axial directions.

Preferably, the axial direction limit member is fixed to at least one of the input member and the output member.

Preferably, the first coil springs have a rigidity that is greater that the rigidity of the second coil springs.

In accordance with yet another aspect of the present invention, a lockup damper is included in a lockup mechanism for a torque convertor for mechanically transmitting torque from an input rotary member to an output rotary member and for absorbing and attenuating vibrations transmitted from the input rotary member to the output rotary member. The lockup damper includes an input member selectively engagable with an input rotary member and an output member connected to an output rotary member of a torque convertor. A first coil spring is functionally disposed between the input member and the output member. A second coil spring is functionally disposed between the first coil spring and the output member. An intermediate member is disposed within the torque convertor. The intermediate member is relatively rotatable with respect to the input member and the output member. The intermediate member has an intermediate support portion extending between the first coil spring and the second coil spring for contacting each of the first coil spring and the second coil spring in a circumferential direction. The intermediate member has an intermediate limit portion extending from the intermediate support portion into an interior of at least one of the first and the second coil springs for limiting a radially outward movement of at least one of the first and the second coil springs. A support member is disposed adjacent to the intermediate member for limiting a movement of the intermediate member in an axial direction in the lockup damper of the torque convertor. The support member further limits radial movement of the intermediate member such that the intermediate member may undergo relative rotary displacement relative to the input member and the output member.

Preferably, the support member is fixed to at least one of the input member and the output member.

Preferably, the first coil springs have a rigidity that is greater that the rigidity of the second coil springs.

When the twist vibrations are inputted from the input rotary member to the lockup damper according to the present invention, the input member and the output member rotate relative to each other so that the first elastic member and the second elastic member are compressed in the rotational direction between the two members. In this case, since the first and second elastic members are disposed in series with each other through the intermediate support portion of the intermediate member, it is possible to maintain wide twist angular characteristics. Also, the radially outward movement of at least one of the first and second elastic members is limited by the intermediate limit portion provided in the intermediate member. As a result, at least one of the first and second elastic members compressed in the rotational direction hardly interferes with the other member to thereby suppress the generation of the frictional resistance or to thereby reduce the frictional resistance.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

First Embodiment

Figure 1:
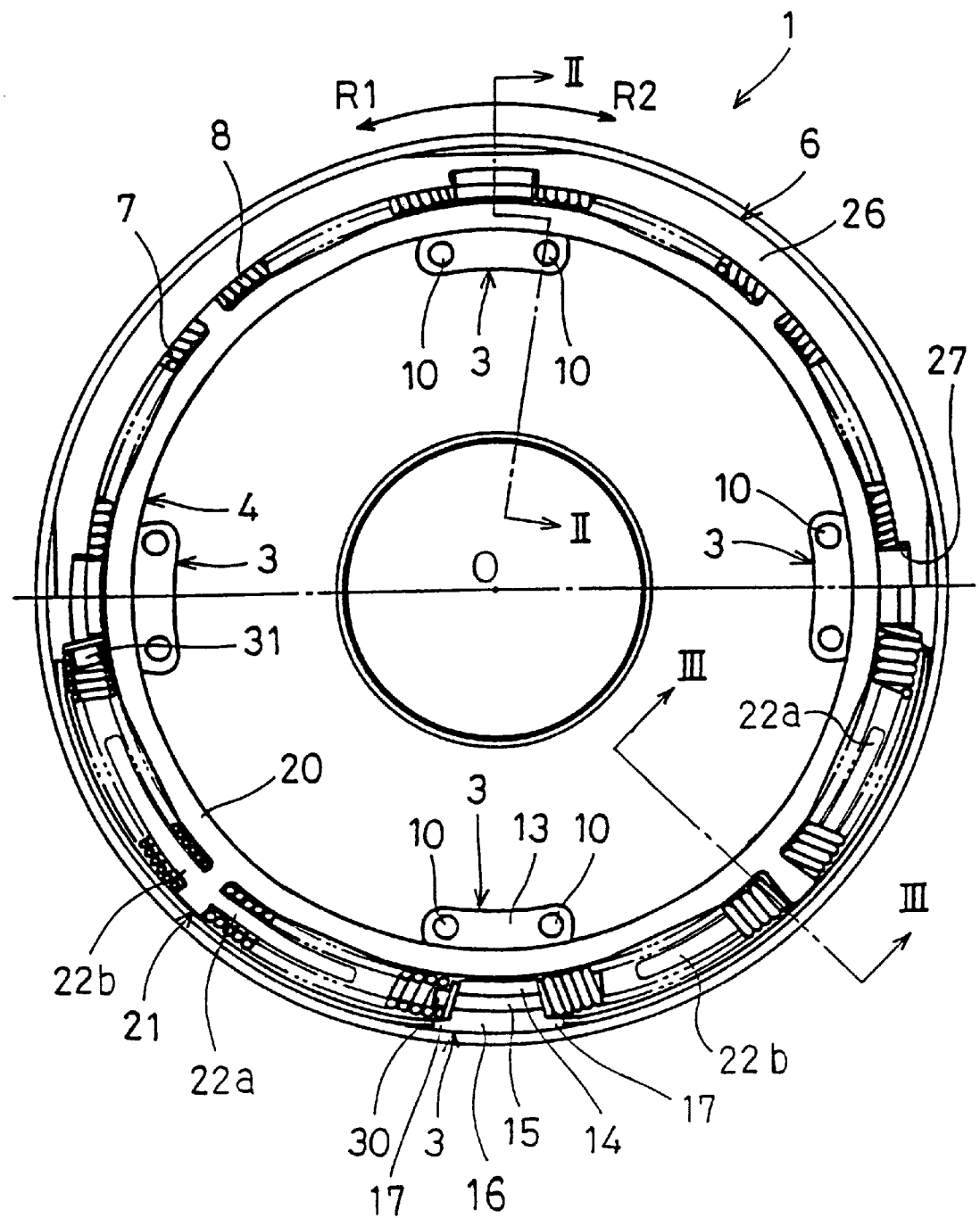
FIG. 1 is a part cutaway, part cross-sectional view of portions of a lockup mechanism of a torque convertor having an intermediate plate in accordance with a first embodiment of the present invention.
Figure 2:
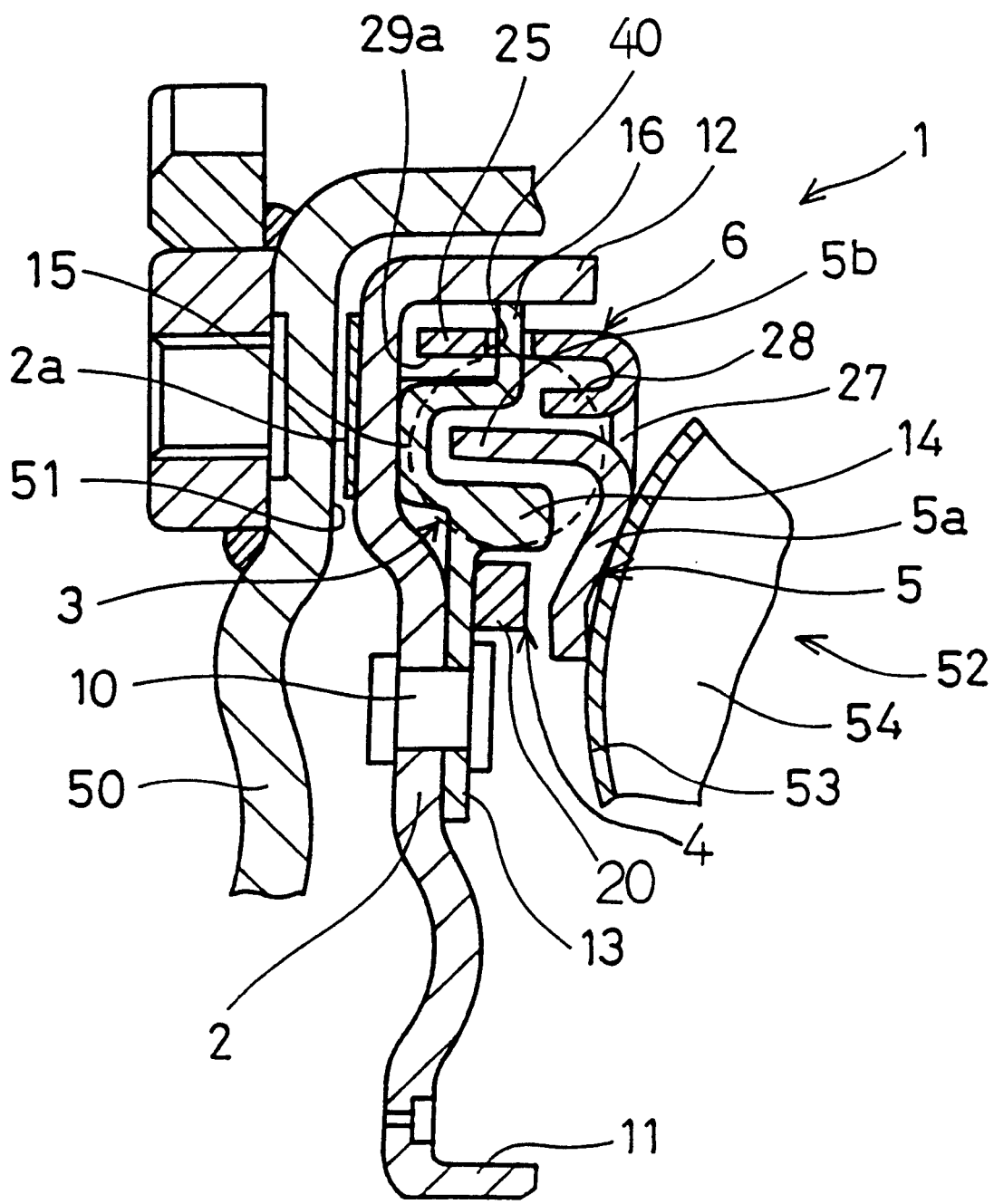
FIG. 2 is a fragmentary, cross-sectional view of the torque convertor showing details of the lockup mechanism, taken along the line II—II in FIG. 1.
Figure 3:
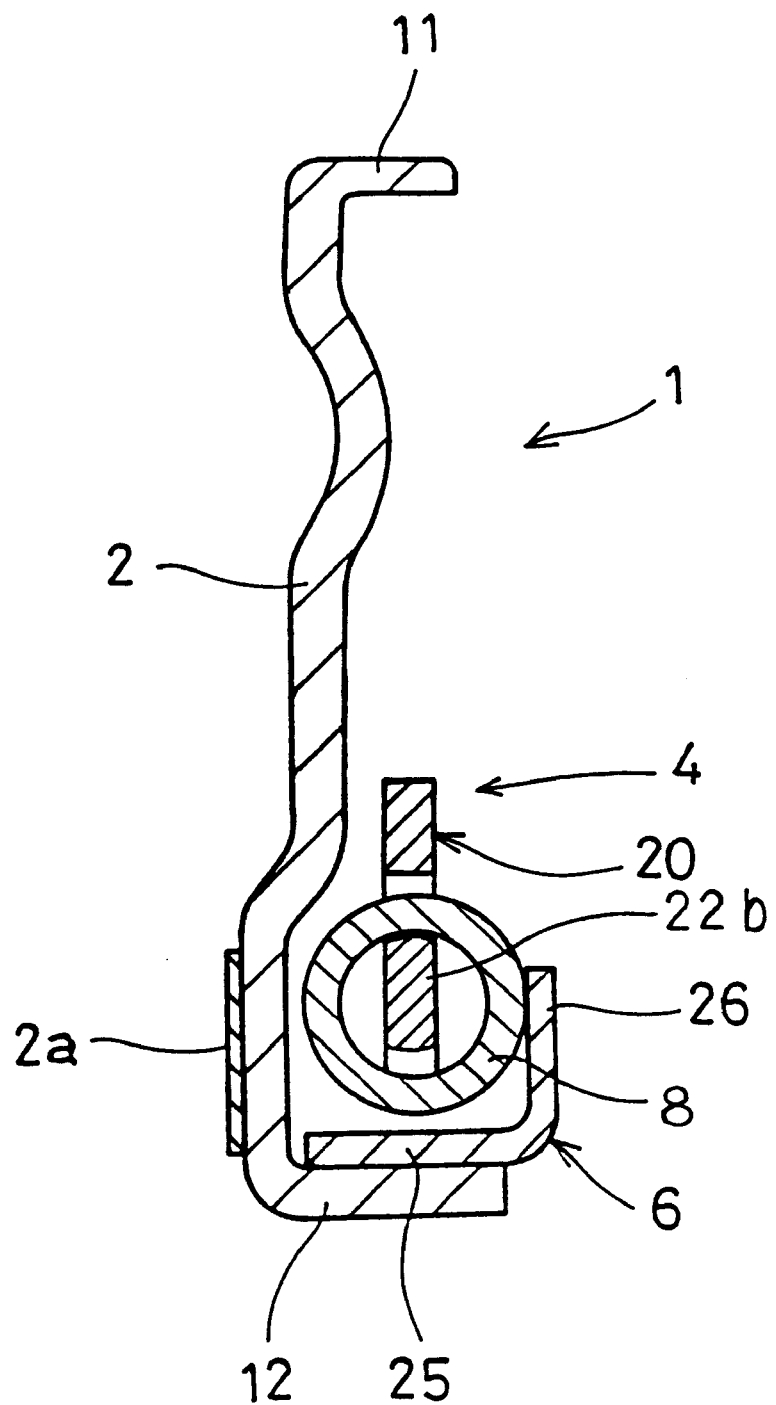
FIG. 3 is a cross-sectional view of the lockup mechanism taken along the line III—III in FIG. 1.

A lockup mechanism 1 of a torque convertor including a lockup damper in accordance with a first embodiment of the present invention is shown in FIGS. 1, 2 and 3. An engine (not shown) is disposed on the left sides of FIGS. 2 and 3, and a transmission (not shown) is disposed on the right sides of FIGS. 2 and 3. Hereinafter, for direction orientation purposes, the left sides of FIGS. 2 and 3 will be referred to as the engine side and the right side of FIGS. 2 and 3 will be referred to as the transmission side.

FIG. 1 is a part cutaway, part cross-sectional view of the lockup mechanism 1, from which an annular portion 5a of a driven plate 5, described below, has been removed, as viewed from the transmission side. Also, with respect to the rotational direction described in FIG. 1, the rotational direction R1 is the forward rotational direction of the engine and the torque convertor, and the rotational direction R2 is the reverse rotational direction.

Since the torque convertor structures having an impeller, a turbine and a stator are will known, a detailed the explanation of such structures is not provided. However, it should be understood that the turbine, impeller and stator are present in the torque convertor having the lockup mechanism 1.

In FIG. 2, there are shown a front cover 50 (input rotary member) of the torque convertor and a turbine 52 (output rotary member) thereof. The front cover 50 is a member connected to the crankshaft of the engine to define a working oil chamber of the torque convertor together with the impeller (not shown). An annular flat friction surface 51 is formed on an outer circumferential side inner wall surface of the front cover 50. The turbine 52 is a vane wheel that faces the impeller (not shown) in the axial direction and is mainly composed of a turbine shell 53, and a plurality of turbine blades 54 fixed to the turbine shell 53. The inner circumferential portion of the turbine shell 53 is connected to a main drive shaft (not shown) of the transmission through a turbine hub.

The lockup mechanism 1 is a mechanism for absorbing and attenuating received twist vibrations while mechanically transmitting torque from the front cover 50 to the turbine 52. Namely, the lockup mechanism 1 has a clutch function and a damper function (lockup damper). The lockup mechanism 1 is disposed in a space between the front cover 50 and the turbine 52 as shown in FIG. 2.

The lockup mechanism 1 includes: an input member in the form of a piston 2 and drive plates 3; an output member mainly composed of a driven plate 5, first and second coil springs (first and second elastic members) 7 and 8 disposed between the input member and the output member; and an intermediate plate (intermediate member) 4.

The input member is composed of the piston 2 and the drive plates 3.

The piston 2 is a clutch member that is axially moveable away from the front cover 50 as shown in FIG. 2 or may engage (contact) the front cover 50 by controlling the hydraulic pressure within the torque convertor in a manner well known in the art. The piston 2 is a disc-like member having an inner circumferential projection 11 and an outer circumferential projection 12. The inner circumferential projection 11 and the outer circumferential projection 12 are sleeve portions that extend toward the transmission side. The inner circumferential projection 11 is supported rotatably relative to the outer circumferential surface of the turbine hub (not shown) and is movable in the axial direction relative to the turbine hub (not shown). A disc-like frictional facing 2a facing the frictional surface 51 of the front cover 50 is fixed to a side surface of the piston 2 on the engine side thereof.

Figure 5:
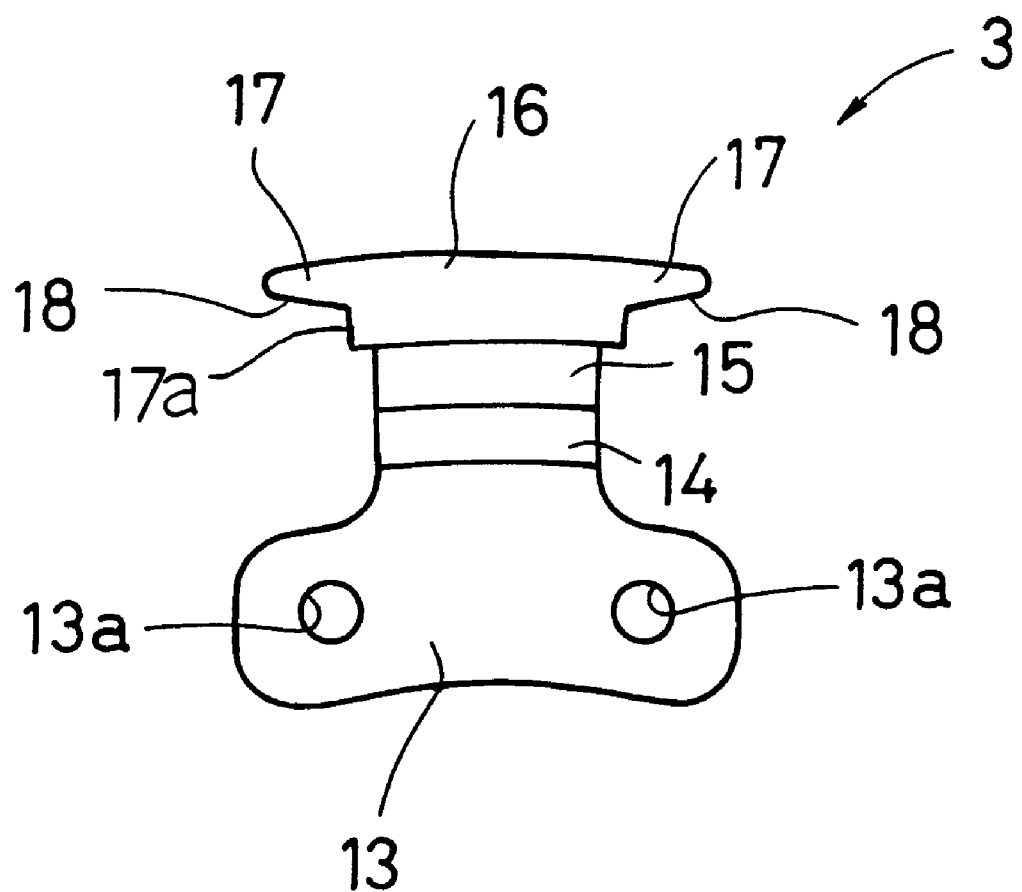
FIG. 5 is a plan view of a drive plate shown removed from the torque convertor depicted in FIGS. 1, 2 and 3.

Each of the drive plates 3 is a member that is fixed to the piston 2 for supporting the first and second coil springs 7 and 8 in the rotational direction. The drive plates 3 are arranged equiangularly at four positions in the engine side outer circumferential portion (on the inner circumferential side of the outer circumferential sleeve portion 12) of the piston 2. As shown in FIGS. 2 and 5, each of the drive plates 3 is composed of a fixture portion 13 extending in the rotational direction, an inner circumferential engagement portion 14 extending on the transmission side from the outer circumferential portion of the fixture portion 13, a recess portion 15 extending radially outwardly from the inner circumferential engagement portion 14 and recessed toward the engine side, and an outer circumferential engagement portion 16 extending further radially outwardly from the recess portion 15.

The inner circumferential engagement portion 14, the recess portion 15 and the outer circumferential engagement portion 16 are used as input support portions that are contactable with the inner circumferential side, the radially intermediate portions and the outer circumferential side of the first and second spring seats 30 and 31, described below. The first and second spring seats 30 and 31, as described below, are seated at end faces of the first and second coil springs 7 and 8, respectively.

Holes 13a through which rivets 10 extend are formed in the fixture portion 13. Each of the drive plates 3 is fixed to the piston 2 in a one-piece manner by the rivets 10 as shown in FIG. 2. Since the input support portions (inner circumferential engagement portion 14, the recess portion 15) support the end faces of the first and second coil springs 7 and 8 at different positions in the radial direction, the support of the end portions of the first and second coil springs 7 and 8 are more stable than prior art configurations. The outer circumferential surface of the outer circumferential engagement portion 16 is in contact with the inner circumferential surface of the outer circumferential projection 12 of the piston 2, as shown in FIG. 2. Thus, it is easy to position the drive plates 3 and it is possible to suppress deformation of the drive plates 3 in the radial outward direction.

First movement limit portions 17 which are projections extending in the rotational direction are formed integrally on either sides in the rotational direction of the outer circumferential engagement portion 16. The first movement limit portions 17 are portions for supporting ends of the first and second coil springs 7 and 8, described below, thereby limiting the radially outward movement of the springs 7 and 8. As shown in FIG. 5, a radial width of the first movement limit portions 17 is decreased in the distant direction in the rotational direction, and each guide surface 18 or inner circumferential surface, is tapered from a surface 17a toward a tip end of each first movement limit portion 17. Accordingly, portions of the first and second coil springs 7 and 8 in contact with the guide surfaces 18 and surface 17a are retained radially inwardly the tip end of the first movement limit portions 17.

Each first and second coil springs 7 and 8 are linked to each other through the intermediate plate 4 to form a pair of springs. Four pairs of first and second coil springs 7 and 8 are arranged equiangularly in the rotational direction around the lockup clutch mechanism 1 and work in parallel with each other. The rigidity of the first coil springs 7 is greater than that of the second coil springs 8. Thus, two stage twist characteristics are obtained by the lockup damper of the lockup mechanism 1.

The first coil spring 7 of each pair of springs is disposed on the side in the forward rotational direction R1 relative to the second coil spring 8 with the intermediate support portion 21 of the intermediate plate 4 being disposed therebetween. The first spring seat 30 is provided at the end of each first coil spring 7 in the forward rotation direction R1. The first spring seat 30 is composed of a disc-like support portion and an engagement portion extending into the coil spring from the support portion. The back surface of the support portion of the first spring seat 30 engages the inner circumferential engagement portion 14, the recess portion 15 and the outer circumferential engagement portion 16 and the surface 17a of the drive plate 3.

The second spring seat 31 is provided at the end of each second coil spring 8 in the reverse rotational direction R2. The second spring seat 31 has substantially the same structure as that of the first spring seat 30 and is supported to the input support portion of the drive plate 3 in a similar manner.

Figure 4:
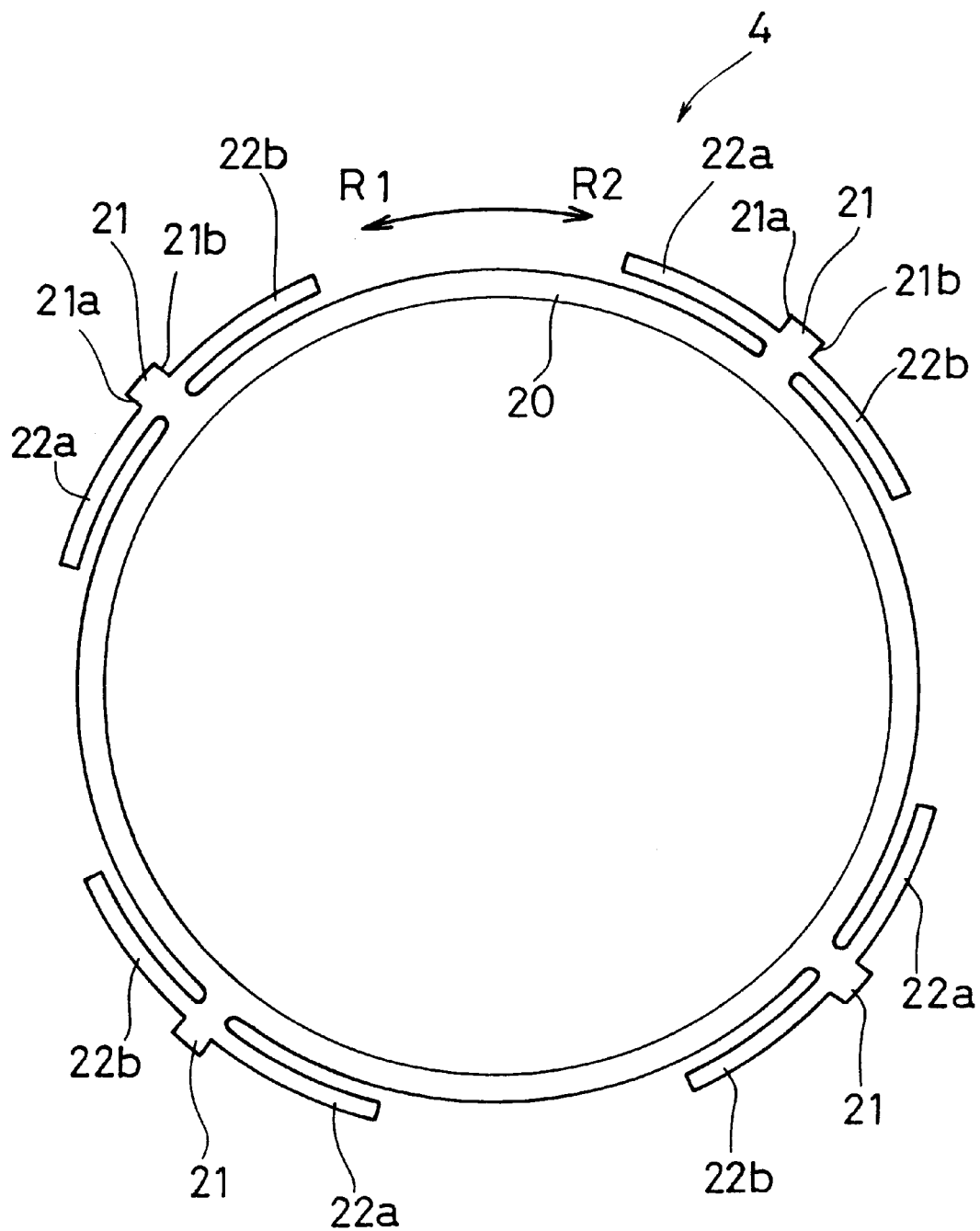
FIG. 4 is a plan view of the intermediate plate shown removed from the torque convertor depicted in FIGS. 1, 2 and 3.

The intermediate plate 4 is an intermediate member functionally disposed between the first and second coil springs 7 and 8. As shown in FIG. 4, the intermediate plate 4 is composed of a ring (connecting portion) 20, support portions 21, and first and second intermediate limit portions 22a and 22b.

Each support portion 21 is disposed between the end of the first coil spring 7 in the reverse rotational direction R2 and the end of the second coil spring 8 in the forward rotational direction R1 for transmitting the torque between the first and second coil springs 7 and 8. Each support portion 21 has a rectangular shape whose width in the rotational direction is decreased radially inwardly. Both side surfaces in the rotational direction are first and second slant support surfaces 21a and 21b. Thus, since the first and second support surfaces 21a and 21b are slanted, it is possible to avoid a local contact between the first and second support surfaces 21a and 21b and the first and second coil springs 7 and 8. Accordingly, the service life of the first and second coil springs 7 and 8 or the intermediate plate 4 is prolonged.

Figure 8:
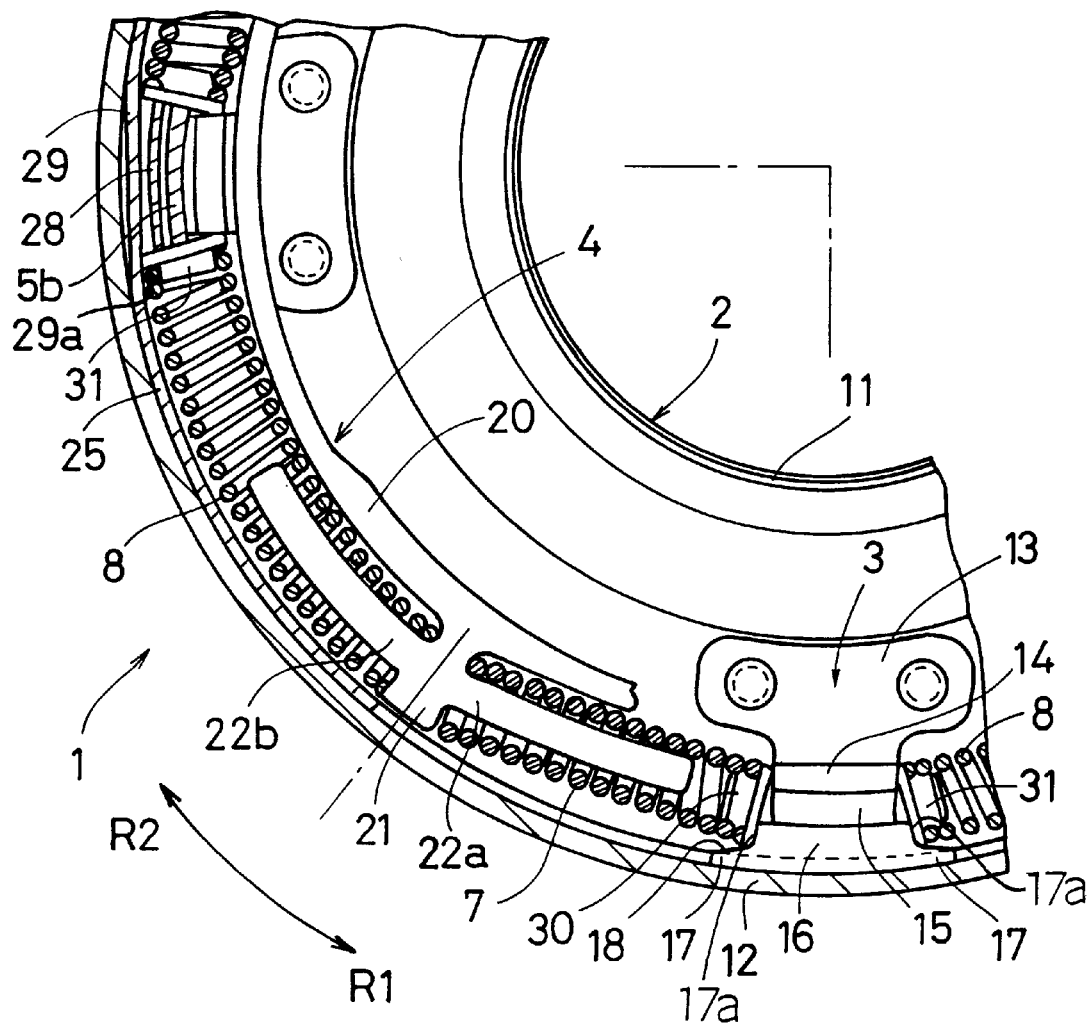
FIG. 8 is a fragmentary, cross sectional view of the lockup mechanism depicted in FIGS. 1, 2 and 3 with portions of the lockup clutch and torque convertor removed to provide greater clarity.

The first and second intermediate limit portions 22a and 22b are formed integrally with the ring 20 and the intermediate support portion 21 as a single unit. The first and second intermediate limit portions 22a and 22b extend in the circumferential direction from the first and second support surfaces 21a and 21b, respectively, and are inserted into the interior of the first coil spring 7 and the interior of the second coil spring 8, as shown in FIG. 8.

The circumferential length of each of the first and second intermediate limit portions 22a and 22b is predetermined to correspondence to an allowable deformation limit of each of the first and second coil springs 7 and 8, respectively. The first and second intermediate portions 22a and 22b extend along the interior central portions of the first and second coil springs 7 and 8. Also, the first and second intermediate limit portions 22a and 22b are in contact with the inner circumferential surfaces of each first and second coil springs 7 and 8 as shown in FIGS. 3 and 8. The four support portions 21 are further connected to each other by the ring 20. Thus, the radially outward movement of each intermediate portion 21 is limited. As a result, the radially outward movement of the first and second coil springs 7 and 8 is limited by the first and second intermediate limit portions 22a and 22b.

Incidentally, since the intermediate plate 4 is not directly supported by other members, the frictional resistance with the adjacent members hardly occurs.

The output member of the lockup mechanism 1 is composed of the driven plate 5 and the support ring 6. The driven plate 5 is fixed to the turbine shell 53 of the turbine 52, and has an annular portion 5a welded to the turbine shell 53. There are four engagement portions 5b (FIGS. 2 and 8) which extend from the annular portion 5a on the engine side of the driven plate 5. The four engagement portions 5b extend between the adjacent ends of pairs of the first and second coil springs 7. The engagement portions 5b extend into the recess portion 15 of the drive plate 3 with both ends in the rotational direction being in contact with the first spring seat 30 and the second spring seat 31.

Figure 6:
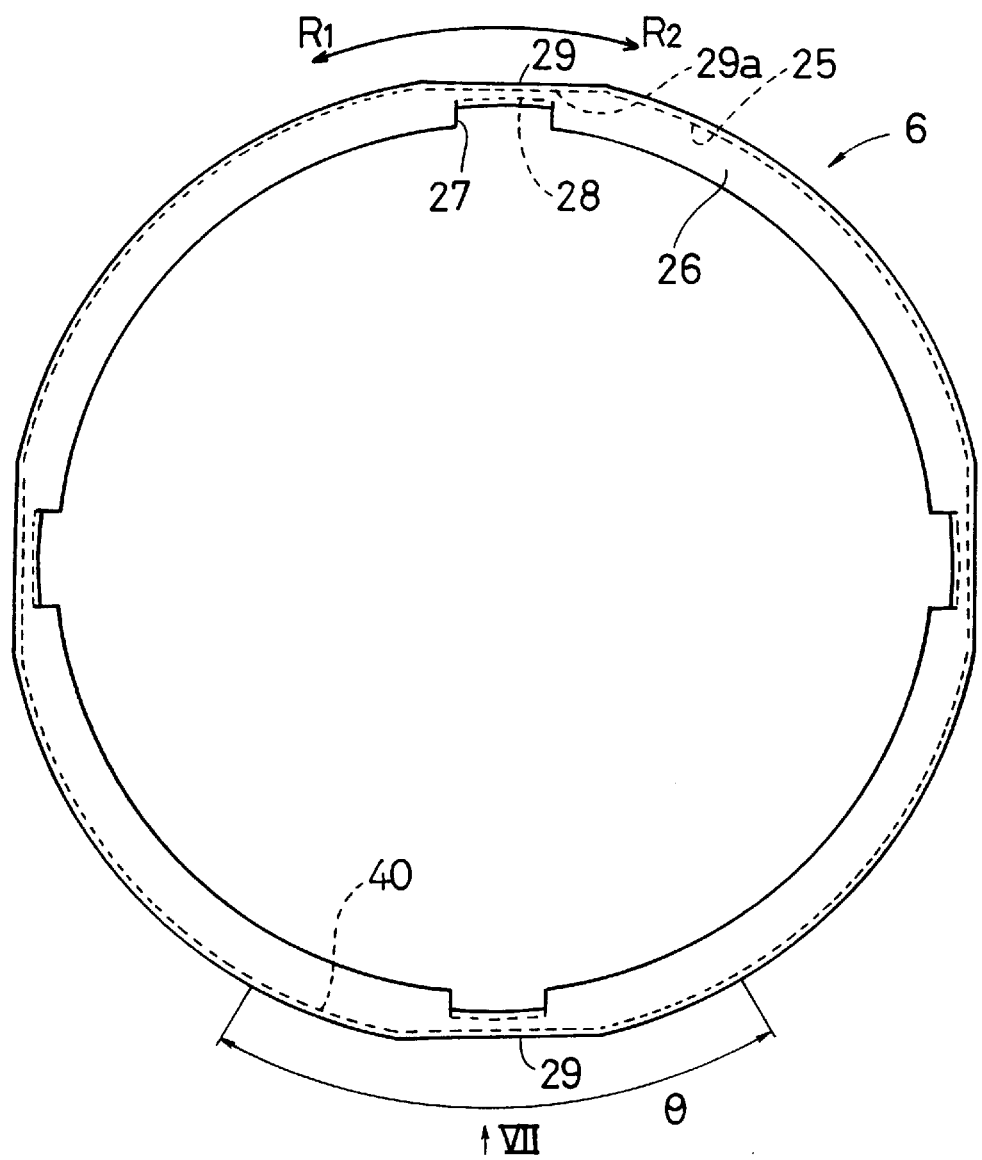
FIG. 6 is a plan view of a support ring shown removed from the torque convertor depicted in FIGS. 1, 2 and 3.
Figure 7:
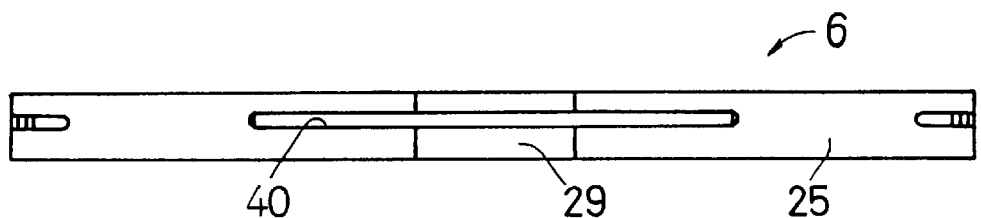
FIG. 7 is a side elevational view of the support ring looking in the direction of the arrow VII in FIG. 6.

As shown in FIGS. 6 and 7, the support ring 6 is an annular pressed plate member which is mainly composed of a sleeve portion 25 and a disc-like portion 26 extending radially inwardly from the end of the sleeve portion 25 on the transmission side (also see FIG. 2).

Four cutaway engagement portions 27 are formed equidistantly in the rotation direction in the inner circumferential edge of the disc-like portion 26. The engagement portions 5b of the driven plate 5 extend into the cutaway engagement portion 27 and engaged the circumferential ends of each cutaway engagement portion 27. Thus, the support ring 6 rotates together with the driven plate 5. Incidentally, the engagement between the engagement portions 5b and the cutaway engagement portions 27 allows for axial movement therebetween but does not allow for circumferential relative movement. This is convenient with regard to assembling the lockup mechanism 1 and hence the torque convertor itself.

In each portion in which the cutaway engagement portion 27 is formed, a part of the disc-like portion 26 is bent radially outward, as shown in FIG. 2, to define a spring contact portion 28. As shown in FIG. 8, the spring contact portion 28 is in contact with the first spring seat 30 and the second spring seat 31. Namely, the spring contact portion 28 forms the output support portion together with the engagement portions 5b of the driven plate 5.

Since the different positions, in the radial direction, of the first and second spring seats 30 and 31 are supported by the spring contact portion 28 and the engagement portion 5b, in the same manner as in the input support portion, the support of the end portions of the first and second coil springs 7 and 8 are stable.

The sleeve portion 25 is disposed so as to cover the outer circumferences of the first and second coil springs 7 and 8 radially inwardly from the outer circumferential projection 12 (see FIG. 2). Although the sleeve portion 25 is close to the outer circumferential projection 12 of the piston 2, a gap is established therebetween, as shown in FIG. 2. The sleeve portion 25 covers the outer circumferential side of the first and second coil springs 7 and 8 to thereby prevent these members from moving radially outwardly. As shown in FIGS. 1 and 8, a gap in the radial direction is kept between the sleeve portion 25 and the outer circumferential portions of the first and second coil springs 7 and 8. Also, a gap in the radial direction is kept between the sleeve portion 25 and the support portions 21 of the intermediate plate 4. Furthermore, in the sleeve portion 25, second movement limit portions 29 that are in the form of the linear shape and are located radially inwardly in comparison with the other arcuate portions are formed at four positions in the rotational direction corresponding to the drive plate 3.

The second movement limit portions 29 extend on both sides in the rotational direction from the vicinity of the drive plate 3, and extend to the outer circumferential sides of the first spring seat 30, a portion of the end of each first coil spring 7 in the forward rotational direction R1, the second spring seat 31 and an end portion of each second coil spring 8 in the reverse rotational direction R2. As a result, radially outward movement of the end portions of the first and second coil springs 7 and 8 is limited by the guide surfaces 29a. The guide surfaces 29a of the second movement limit portions 29 are slanted radially inwardly from the inner circumferential surfaces of the other arcuate portions. Namely, in the portions corresponding to the outer circumferential sides of the first and second spring seats 30 and 31, the outer portions of the guide surfaces 29a in the rotational direction are disposed radially inwardly from the inside portions in the rotational direction. Accordingly, the portions that are in contact with the guide surfaces 29a at the end portions of the first and second coil springs 7 and 8 are disposed more radially inwardly than the other portions.

Furthermore, slits 40 that extend through an angle θ in the rotational direction in the sleeve portion 25 are formed in the portions where the second movement limit portions 29 are formed (see FIGS. 6 and 7). A portion of the outer circumferential engagement portions 16 of the drive plate 3 extend into the slits 40. The length of the slits 40 are predetermined so that when there is relative rotation (twist angle) between the input member and the output member, the ends of the first movement limit portions 17 of the circumferential engagement portions 16 are brought into contact with the end portions of the slits 40, whereby the slits 40 may serve as the stoppers for stopping the relative rotation between the input member and the output member.

Incidentally, since the driven plate 5 and the support ring 6 are made of discrete members, although the number of the mechanical parts is increased, the structure of each part may be simplified. For this reason, it is easy to work the overall structure in comparison with the one-piece member.

The operation will now be described.

The torque from the crankshaft on the engine (not shown) is inputted into the front cover 50 through a flexible plate (not shown). This torque is transmitted to the impeller (not shown). When the impeller is rotated, the working oil is caused to flow against the turbine 52 to thereby rotate the turbine 52. The torque of the turbine 52 is outputted to the main drive shaft through the turbine hub (not shown).

When the speed ratio of the torque convertor is increased and the main drive shaft is rotated at a predetermined rotational speed, the working oil between the piston 2 and the front cover 50 is drained through the interior of the main drive shaft. As a result, the piston 2 is pressed against the frictional surface 51 of the front cover 50 by the hydraulic pressure difference. Thus, the torque of the front cover 50 is transmitted to the turbine 52 through the lockup mechanism 1. Namely, the front cover 50 and the turbine 52 are mechanically connected to each other, so that the torque of the front cover 50 is directly outputted to the main drive shaft without the impeller.

In a lockup engagement condition, the input support portions (the inner circumferential engagement portion 14, the recess portion 15, the outer circumferential engagement portion 16) of the drive plate 3 press the first and second coil springs 7 and 8, connected to each other by the intermediate plate 4, in the forward rotational direction R1. The first coil springs press the output support portions (engagement portions 5b and spring contact portions 28) of the driven plate 5. Thus, the torque is transmitted from the piston 2 to the driven plate 5.

In a lockup engagement condition, the lockup mechanism 1 transmits the torque and absorbs and attenuates the twist vibrations received from the front cover 50. More specifically, the first coil springs 7 and the second coil springs 8 are expanded and compressed between the drive plate 3 and the driven plate 5 to thereby absorb and attenuate the twist vibrations. In this case, since the first coil springs 7 and the second coil springs 8 work in series, the relatively rotatable angle between the input member and the output member is increased. In spite of the fact that the first and second coil springs 7 and 8 are arranged in the outer circumferential portions of the torque convertor and the lockup mechanism 1, it is possible to obtain wide twist angle characteristics (large angular relative displacement). Also, since the rigidity (spring constant) of the first coil springs 7 is different from the rigidity of the second coil springs 8 to thereby impart the two-stage twist characteristics to the lockup damper, the vibrations may be effectively absorbed and attenuated in response to the amplitude and the frequency of the twist vibration to be received.

Since the overall lockup mechanism 1 is rotated in the torque transmission, the first and second coil springs 7 and 8 for absorbing and attenuating the vibrations are subjected to the centrifugal force. The first and second coil springs 7 and 8 are to be moved radially outwardly by the centrifugal force. Also, the first and second coil springs 7 and 8 are disposed in series with each other, and the vicinity of the joint between the first and second coil springs 7 and 8 is likely to project particularly radially inwardly. However, in this embodiment, since both ends in the rotational direction of the pair of the first and second coil springs 7 and 8 (the end in the forward rotational direction R1 of the first coil spring 7 and the end in the reverse rotational direction R2 of the second coil spring 8) are supported by the first movement limit portion 17 and the second movement limit portion 29 through the first and second spring seats 30 and 31, the frictional resistance hardly occurs between both ends in the rotational direction of the first and second coil springs 7 and 8 and the sleeve portion 25 of the support ring 6. Furthermore, by the first and second intermediate limit portions 22a and 22b of the intermediate plate 4, the end in the reverse rotational direction R2 of the first coil spring 7, the intermediate portion in the rotational direction thereof, the end in the forward rotational direction R1 of the second coil spring 8, the intermediate portion in the rotational direction thereof and the like are limited for radially outward movement. As a result, the frictional resistance hardly occurs between these components and the sleeve portions 25. In the lockup damper in which the twist angle is expanded by providing the first and second coil springs 7 and 8 in series in the rotational direction, since the radially outward movement of the respective portions in the rotational direction of the first and second coil springs 7 and 8 is limited, it is possible to suppress the frictional resistance between the first and second coil springs 7 and 8 and the other component (support ring 6). Although a slight frictional resistance is generated between the first and second intermediate limit portions 22a and 22b and the inner circumferential surfaces of the first and second coil springs 7 and 8, the frictional resistance is small in comparison with the case where the outer circumferential surfaces of the first and second coil springs 7 and 8 slide with and along the other components.

Subsequently, the further detail of the twist operation of the lockup mechanism 1 will now be described with reference to FIG. 8. For instance, the driven plate 5 may be twisted in the reverse rotational direction R2 as shown in FIG. 8 from the neutral condition (shown in FIG. 1). In this case, the engagement portion 5b and the spring engagement portions 28 press the first spring seats 30 in the reverse rotational direction R2. At this time, since the end portion of each first coil spring 7 in the forward rotational direction R1 and the sleeve portion 25 are moved at substantially same speed as that of the driven plate 5, the frictional resistance hardly occurs between the first coil spring 7 and the sleeve portion 25.

In a displacement range where the twist angle is small, the second coil springs 8 (which have a lower rigidity than the springs 7) are mainly compressed, and the first coil springs 7 are only slightly compressed. Although there is a speed difference between the second coil springs 8 and the sleeve portion 25, the ends of the second coil springs 8 in the reverse rotational direction R2 are supported by the first movement limit portions 17 of the drive plate 3 so that the ends are hardly moved radially outwardly. Also, radially outward movement of the intermediate portions in the rotational direction of the second coil springs 8 is limited by the second intermediate limit portions 22b. Therefore, the frictional resistance hardly occurs between the second coil spring 8 and the sleeve portion 25. When the twist angle is further increased, the second intermediate limit portions 22b are brought into contact with the input support portions (inner circumferential engagement portion 14, recess portion 15, outer circumferential engagement portion 16) through the second spring seats 31. As a result, the relative rotation between the piston 2 and the drive plate 3 and the intermediate plate 4 is stopped.

Thereafter, the second coil springs 8 are not compressed, but only the first coil springs 7 are further compressed. When the twist angle is further increased, the first intermediate limit portions 22a are brought into contact with the output support portions (engagement portions 5b, spring contact portions 28) through the first spring seats 30. As a result, the relative rotation between the intermediate plate 4 and the driven plate 5 is stopped. Thus, the relative rotation between the drive plate 3 and the driven plate 5 is stopped through the intermediate plate 4. Incidentally, the first and second coil springs 7 and 8 are set so as not to be deformed exceeding a predetermined deformation amount by the first and second intermediate limit portions 22a and 22b. There is no fear that the excessive compression which is undesirable in view of a desirable mechanical strength of the first and second coil springs 7 and 8. Accordingly, a sufficiently long service life of the first and second coil springs 7 and 8 is ensured in view of the mechanical strength.

Also, in the case where the driven plate 5 is twisted from the neutral condition shown in FIG. 8 in the forward rotational direction R1, in the same manner as described above, the deformation of the first and second coil springs 7 and 8 is limited by the first and second intermediate limit portions 22a and 22b to thereby ensure the sufficiently long service life in view of the mechanical strength of the first and second coil springs 7 and 8.

In this case, since the guide surfaces 18 are formed in the first movement limit portions 17, the outer circumferential portions of the ends of the compressed second coil springs 8 in the reverse rotational direction R2 are guided radially inwardly by the guide surfaces 18. Also, since the guide surfaces 29a are provided on the second movement limit portions 29, the outer circumferential portions of the ends of the first coil springs 7 in the forward rotational direction R1 are guided radially inwardly by the guide surfaces 29a. Incidentally, each guide surface 18, 29a extends in the original direction from the condition in which the coil springs 7 and 8 are compressed and guides the end portions of the first and second coil springs 7 and 8 radially inwardly to smoothly return back to the original position even if the end portions of the first and second coil springs 7 and 8 are brought into contact with the separated first and second movement limit portions 17 and 29. Accordingly, even in the structure in which, in a torsion free condition, the radially outward movement of both end portions of the first and second coil springs are not limited by the first movement limit portions 17 (i.e., the structure in which both end portions are separated in the rotational direction away from the support portions of the input member or the output member), the guide surfaces 18 and 29a guide the end portions of the first and second coil springs 7 and 8 radially inwardly without fail when the first and second coil springs 7 and 8 are compressed, and the guide surfaces may ensure a sufficient space between each of the first and second coil springs 7 and 8 and the member disposed on the outer circumferential side. As a result, the frictional resistance that is unnecessary in absorbing and attenuating the twist vibrations hardly occurs.

Since the first movement limit portions 17 are projections provided on the outer circumferential side of the drive plate 3, the structure is simple and function is easy. Also, the second movement limit portions 29 are simply formed by slightly deforming the sleeve portion 25. With such a simple structure that is easy to work, both ends in the rotational direction of the pair of first and second coil springs 7 and 8 may be supported and the unnecessary friction resistance is reduced.

The first movement limit portions 17 and the second movement limit portions 29 are disposed radially outwardly of the ends in the forward rotational direction R1 of the first coil springs 7 and the ends in the reverse rotational direction R2 of the second coil springs 8 and are brought into contact with the outer circumferential portions of these ends to thereby limit the radially outward movement of both end portions. Accordingly, with a simple structure, it is possible to ensure an excellent effect.

The first and second intermediate limit portions 22a and 22b are disposed in the inner spaces of the coil springs that are not utilized in the prior art and serves both as the limit of the radial movement of the coil springs and as the limit of the compression deformation of the coil springs. Accordingly, without enlarging the size of the lockup mechanism 1, it is possible to reduce the extra frictional resistance and to ensure the long service life of the first and second coil springs 7 and 8.

Incidentally, the sleeve portion 25 for covering the outer circumferential sides of the first and second coil springs 7 and 8 may be provided in the input member or the intermediate plate 4.

Second Embodiment

Figure 9:
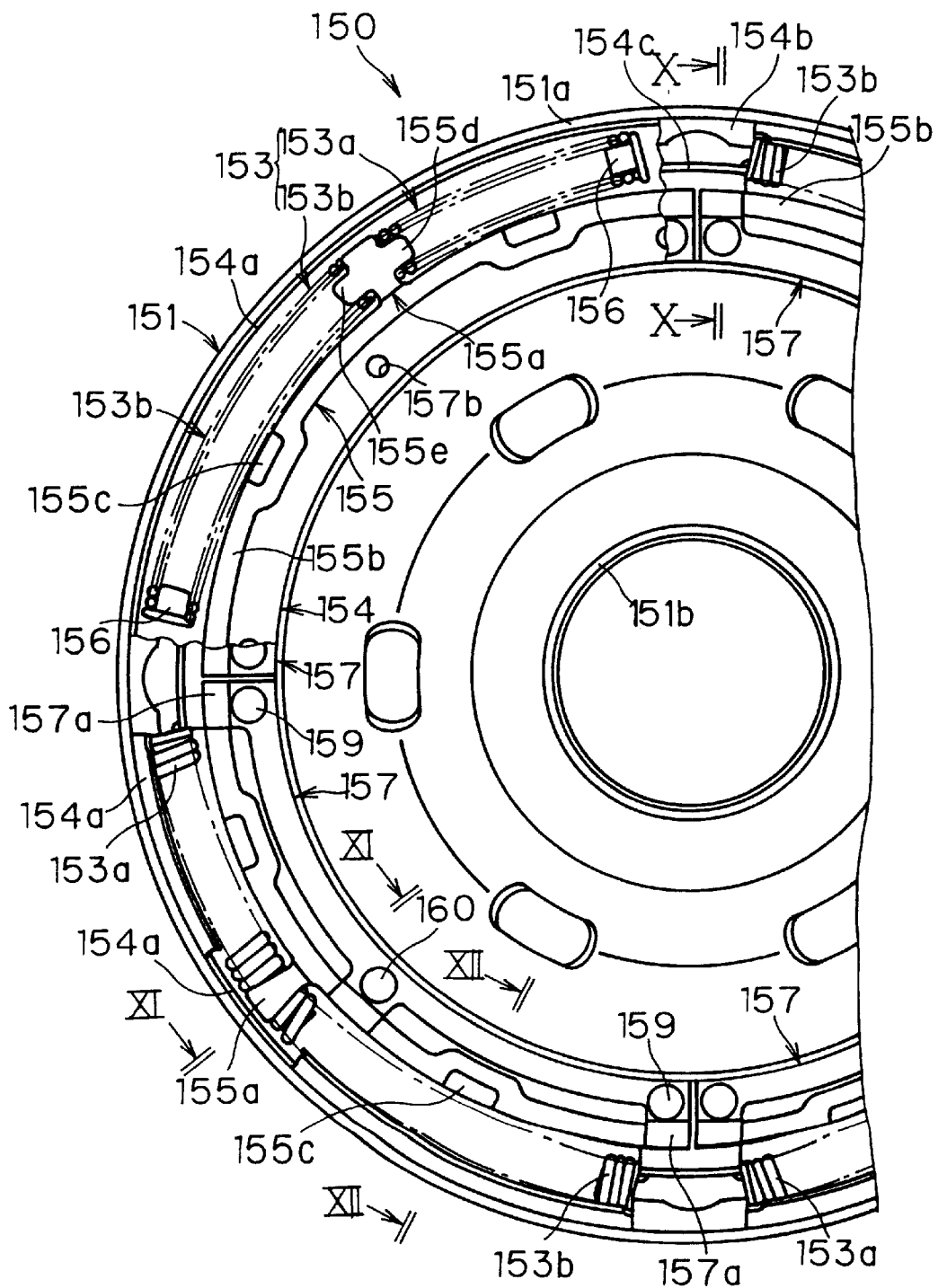
FIG. 9 is a fragmentary, part cutaway, part cross-sectional view of a lockup mechanism having of a torque convertor in accordance with a second embodiment of the present invention.
Figure 10:
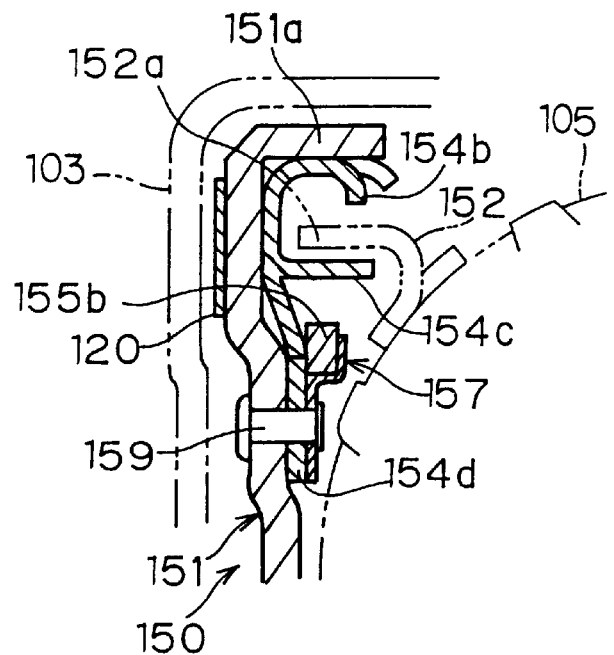
FIG. 10 is a fragmentary, cross-sectional view of the torque convertor showing details of the lockup mechanism taken along the line X—X in FIG. 9.
Figure 11:
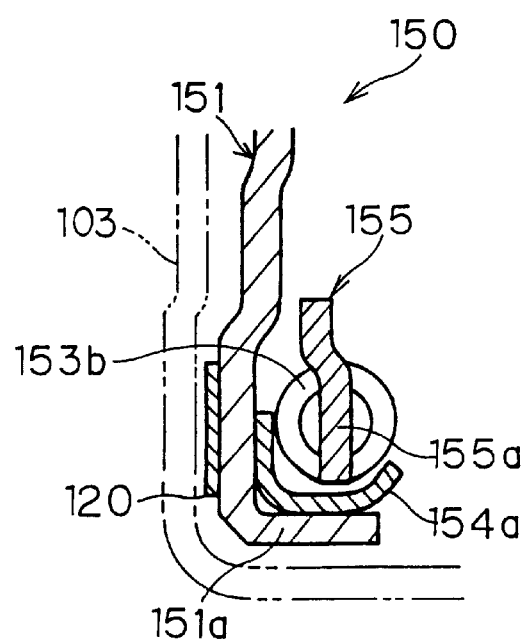
FIG. 11 is a fragmentary, cross-sectional view of the torque convertor showing details of the lockup mechanism taken along the line XI—XI in FIG. 9.
Figure 12:
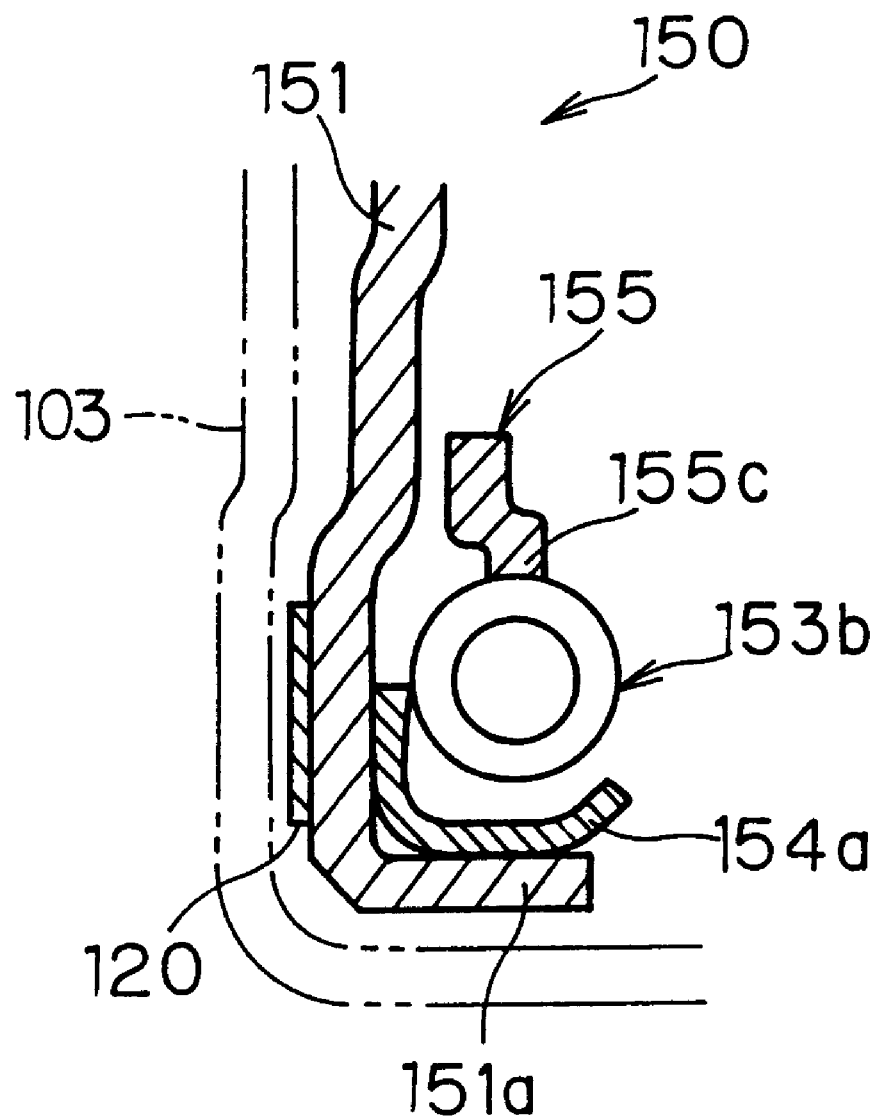
FIG. 12 is a fragmentary, cross-sectional view of the torque convertor showing details of the lockup mechanism taken along the line XII—XII in FIG. 9.

The lockup damper 150 according to a second embodiment of the present invention is shown in FIGS. 9, 10, 11 and 12. The lockup damper 150 is a damper mechanism included in a lockup mechanism of a torque convertor. FIG. 9 shows a partial cutaway plan view from which a driven member 152 has been removed. FIGS. 10 to 12 are partial cross-sectional views of FIG. 9 and shown the driven member 152.

The lockup damper 150 is a mechanism for absorbing and attenuating the received vibrations in the lockup mechanism for mechanically transmitting the torque from the front cover 103 of the torque convertor to the turbine 105. The lockup damper 150 is mainly composed of a piston member 151 which is an input member, a driven member 152 which is an output member, four pairs of coil springs 153 which are elastic members composed of large coil springs 153a and small coil springs 153b, a retaining plate 154 which is a radial limit member, an intermediate plate 155, and a pressure plate 157 which is an axial limit member.

The piston member 151 is a member which may be moved axially away from the front cover 103 (as shown in FIG. 10) or may be moved into engagement with the front cover 103 by controlling the hydraulic pressure within the torque convertor body. The piston member 151 is a disc-like member which has an outer circumferential sleeve portion 151a and an inner circumferential sleeve portion 151b. The outer circumferential sleeve portion 151a and the inner circumferential sleeve portion 151b extend on the transmission side (the right sides of FIGS. 10, 11 and 12). The inner circumferential sleeve portion 151b is supported rotatably relative to the outer circumferential surface of the turbine hub (not shown) fixed to the inner circumferential portion of the turbine 105 and movably in the axial direction. A disc-like frictional facing 120 facing the frictional surface of the front cover 103 is fixed on the side surface of the outer circumferential portion of the piston member 151.

The retaining plate 154 is a member for maintaining the four pairs of coil springs 153, to be described later, on the side of the piston member 151. The retaining plate 154 is disposed inside of the outer circumferential sleeve portion 151a of the piston member 151. As shown in FIG. 11, the retaining plate 154 has an outer circumferential bent portion 154a having an arcuate cross section. The outer circumferential surface of the outer circumferential bent portion 154a is in contact with the inner circumferential surface of the outer circumferential sleeve portion 151a. Fixture portions 154d that extend inwardly are formed at positions that divide the outer circumferential bent portion 154a equidistantly into four parts in the circumferential direction. The inner circumferential portions of these four fixture portions 154d are fixed to the piston member 151 each by two rivets 159. Also, input support portions 154b extend radially inwardly from the ends of the outer circumferential bent portions 154a on the transmission side. Input support portions 154c extend on the transmission side from the radially intermediate portions of the fixture portions 154d are formed.

The driven member 152 is an annular plate member which is welded to the shell outer circumferential portion of the turbine 105. As shown in FIG. 10, four output support portions 152a project on the engine side from the driven member 152. The output support portions 152a are disposed between the input support portions 154b and 154c of the retaining plate 154 in the radial direction.

The coil springs 153 are members for transmitting the toque and for absorbing/attenuating vibrations such as minute twist vibrations caused by the engine rotational variation and the shock caused by the clutch engagement. In this case, the coil springs 153 are formed by two kinds of large coil springs 153a and small coil springs 153b to obtain the two stage damper characteristics. The large coil springs 153a and the small coil springs 153b are disposed in series with each other through intermediate support portions 155a of the intermediate plate 155, described below.

On both sides of the coil springs 153, i.e., first ends of the large coil springs 153a and first ends of the small coil springs 153b, seat members 156 are mounted. The ends of the coil springs 153 are disposed to be engaged with the input support portions 154b and 154c of the retaining plate 154 and the output support portions 152a of the driven member 152. Thus, the coil springs 153 connect the piston member 151 and the driven member 152 elastically to each other in the rotational direction through the retaining plate 154.

Figure 13:
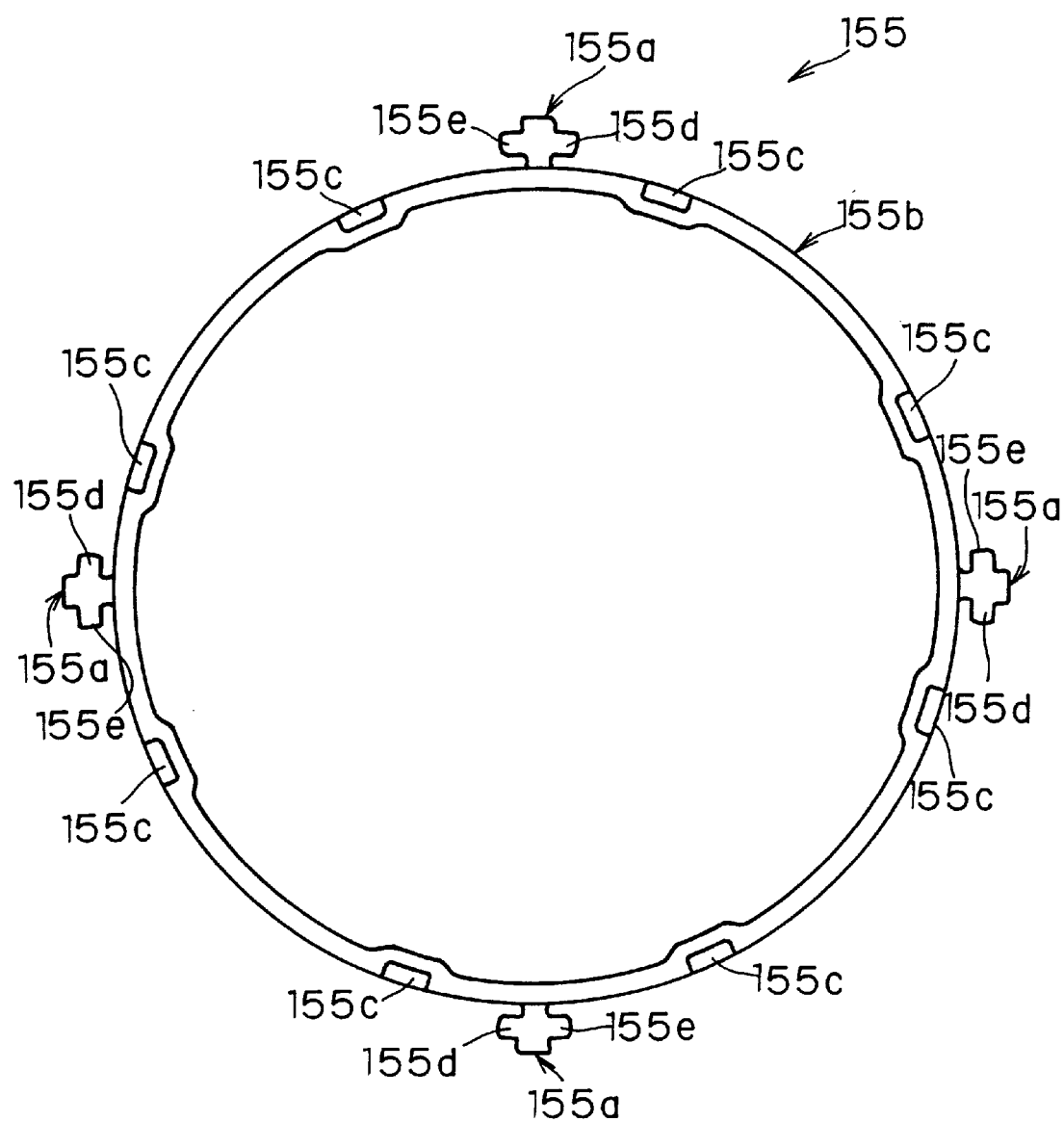
FIG. 13 is a plan view of an intermediate plate of the lockup mechanism depicted in FIGS. 9, 10, 11 and 12 shown removed from the lockup mechanism.

The intermediate plate 155 is the member for connecting joint portions between each spring in the four pairs of coil springs 153 in the radial direction for limiting the radially outward movement of the joint portions. As shown in FIG. 9 and 13, the intermediate plate 155 is composed of an annular plate 155b, intermediate support portions 155a extending radially outwardly from the annular plate 155b at four positions in the circumferential direction, and spring inner circumferential support portions 155c provided in the annular plate 155b at eight positions in the circumferential direction. The annular plate 155b is disposed to be rotatable relative to the retaining plate 154 and the turbine 105 between the retaining plate 154 and the turbine 105 in the axial direction on the inner circumferential side of the coil springs 153.

On each intermediate support portion 155a, there are formed an insertion portion 155d extending on the side of the large spring 153a along the circumferential direction, and an insertion portion 155e extending on the s ide of the small coil spring 153b along the circumferential direction. The insertion portion 155d extends into the large coil spring 153a, and the insertion portion 155e extends into the small coil spring 153b so that the large coil spring 153a and the small coil spring 153b are connected in series with each other. On the other hand, each intermediate support portion 155a is connected radially by the annular plate 155b. Accordingly, the radially outward movement of the joint portions between each pair of large coil springs 153a and the small coil spring 153b supported by the intermediate support portions 155a is limited. As shown in FIG. 12, the spring inner circumferential support portions 155c contact portions on the inner circumferential sides of the respective coil springs 153a and 153b to thereby limit the radially inward movement of the respective coil springs 153a and 153b.

Figure 14:
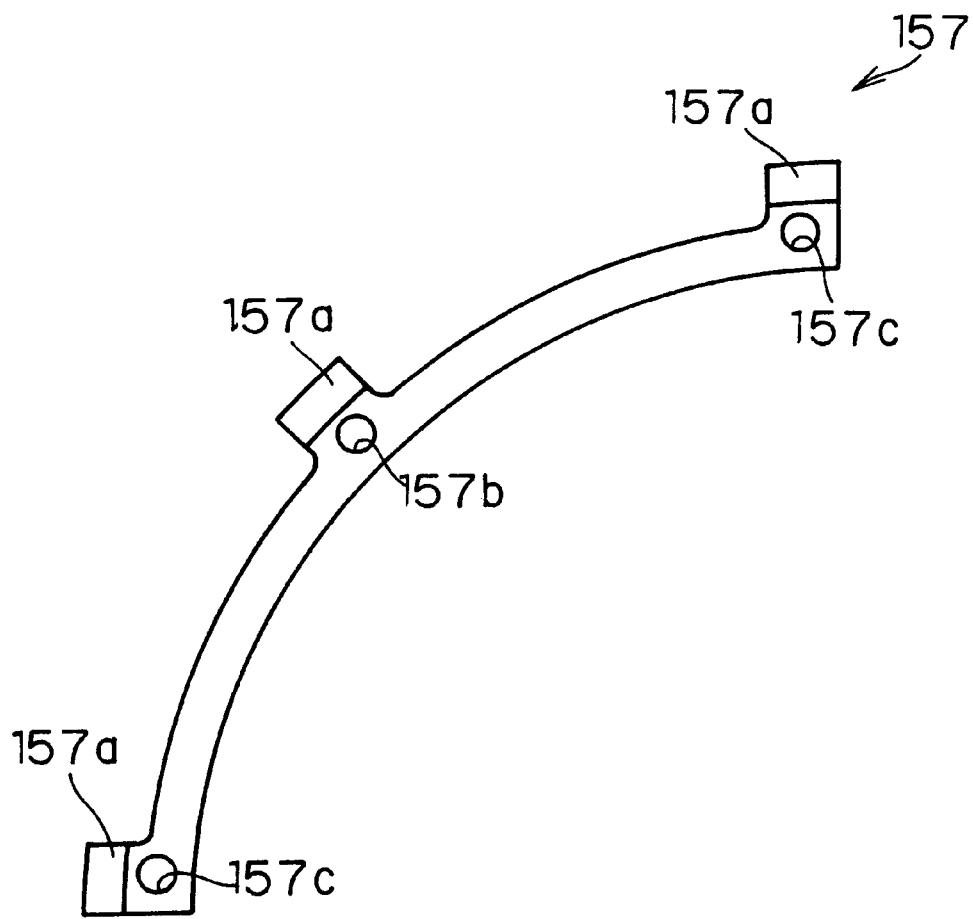
FIG. 14 is a plan view of a pressure plate of the lockup mechanism depicted in FIGS. 9, 10, 11 and 12 shown removed from the lockup mechanism.
Figure 15:
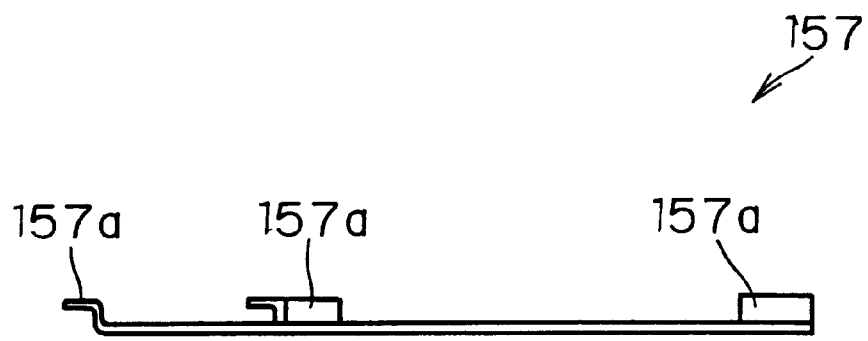
FIG. 15 is a side elevational view of the pressure plate depicted in FIG. 14.

As shown in FIGS. 9 and 10, four pressure plates 157 are used to bias the annular plate 155b of the intermediate plate 155 so as to be rotatable relative to the piston member 151 and the retaining plate 154 to thereby limit the axial movement of the intermediate plate 155. As shown in FIGS. 14 and 15, the pressure plates 157 are each an arcuate member having three pressure portions 157a, and having a single first hole 157b and two second holes 157c. Pressure portions 157a is used to maintain the intermediate plate 155 in cooperation with the retaining plate 154 to thereby limit the axial movement of the intermediate plate 155. Incidentally, the pressure plate 157 is mounted on the piston member 151 by rivets 159 passing through the second holes 157c and a rivet 160 passing the first hole 157b. The rivets 159 are used to mount the retaining plate 154 on the piston member 151 and at the same time to mount the pressure plate 157 on the piston member 151.

The operation will now be described.

In operation of the lockup mechanism, when the twist vibrations are inputted in the front cover 103, the piston member 151 and the driven member 152 are periodically rotated relative to each other so that the coil springs 153 are expanded and compressed in the circumferential direction. In this case, the compressed coil springs 153 are likely to protrude radially outwardly and to move radially outwardly by the centrifugal force. However, the joint portions between the pairs of springs of the coil springs 153 are supported to the intermediate support portions 155a of the intermediate plate 155, and the intermediate support portions 155a are connected to each other by the annular plate 155b in the radial direction. Accordingly, the springs hardly move radially outwardly. As a result, the sliding movement between the joint portions of the coil springs 153 and the outer circumferential bent portions 154a is suppressed. As a result, the frictional resistance generated between the coil springs 153 and the outer circumferential bent portions 154a becomes small. The lockup damper characteristics and in particular the minute twist vibration absorbing characteristics are enhanced.

Also, in the lockup damper 150 in accordance with the embodiment, the axial movement of the intermediate plate 155 is limited by the pressure plates 157 and the retaining plate 154. Accordingly, the axial position of the joint portions of the coil springs 153 supported to the intermediate plate 155 and the intermediate support portions 155a in the lockup damper 150 is stable. For this reason, in repeating the expansion and compression of the coil springs 153, it is possible to avoid the interference of the joint portions of the coil springs 153 with the other member or the generation of the extra frictional resistance caused by the sliding movement of the joint portions of the intermediate plate 155 and the coil springs 153 with the other member. Thus, in the second embodiment of the present invention, the characteristics of the lockup damper 150 are stable.

Third Embodiment

In a third embodiment, the intermediate plate 155 and the pressure plates 157 used in the second embodiment, are replaced with intermediate plates 165 and support members 177. The other components that are the same as those in the second embodiment are used in this embodiment.

Figure 16:
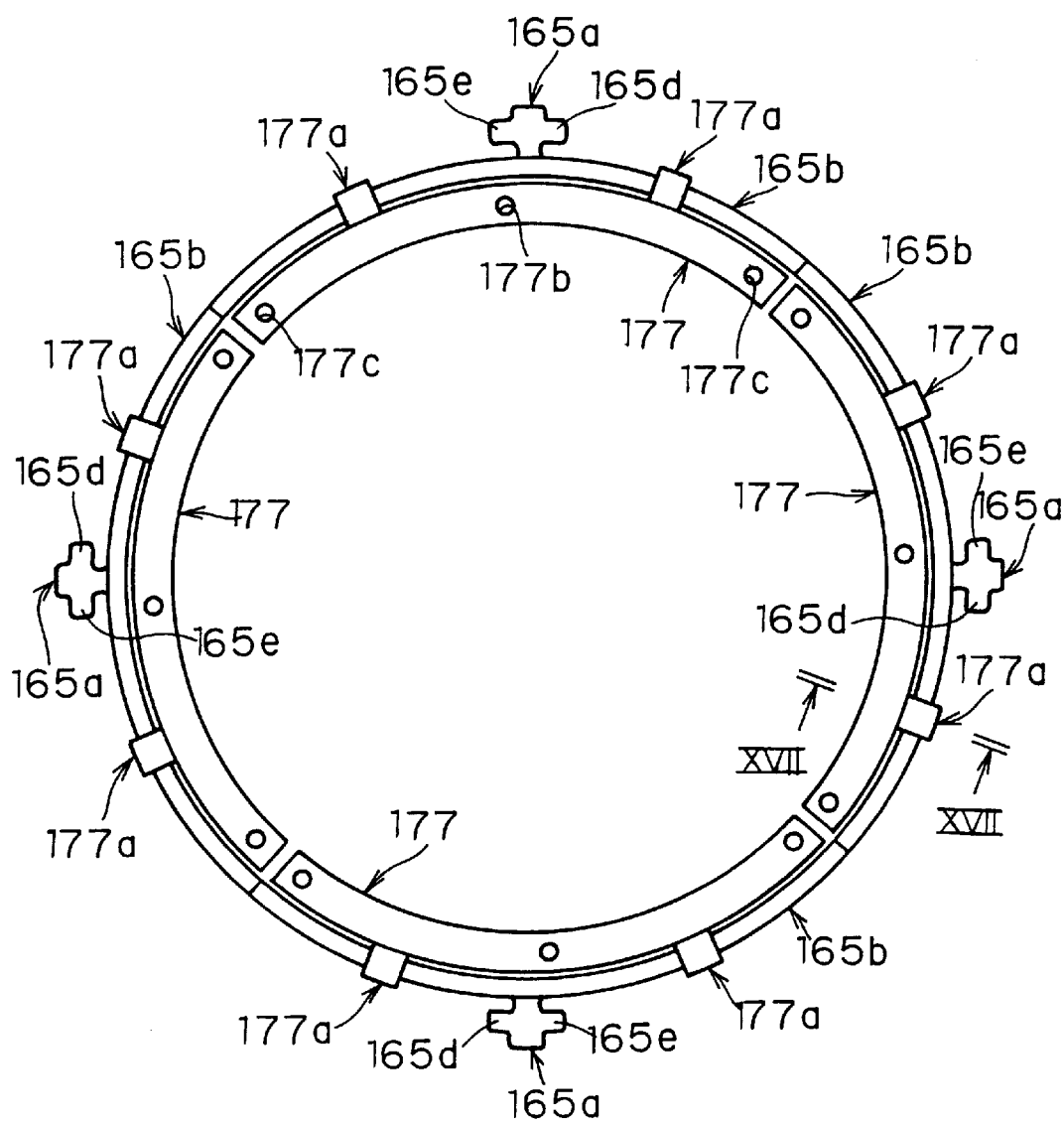
FIG. 16 is a plan view similar to FIG. 13, showing intermediate members and support members of a lockup mechanism of a torque convertor in accordance with a third embodiment of the present invention, with the intermediate members shown removed from the lockup mechanism to provide greater clarity.

The intermediate plates 165 are members for limiting a radial movement of the joint portions of the coil springs 153. Four intermediate plates which are the same are used. The intermediate plates 165 are each composed of an arcuate plate 165b and an intermediate support portions 165a projecting radially outwardly from the arcuate plate 165b, as shown in FIG. 16. The arcuate plates 165b are disposed so as to be rotatable relative to the retaining plate 154 and the turbine 105 between the retaining plate 154 and the turbine 105 in the axial direction inside of the coil springs 153. In each intermediate support portion 165a, there are formed an insertion portion 165d extending on the large coil spring 153a side along the circumferential direction and an insertion portion 165e extending on the small coil spring 153b side along the circumferential side. Then, the insertion portion 165d is inserted into the large coil spring 153a, and the insertion portion 165e is inserted into the small coil spring 153b so that the large coil spring 153a and the small coil spring 153b are connected in series with each other.

Figure 17:
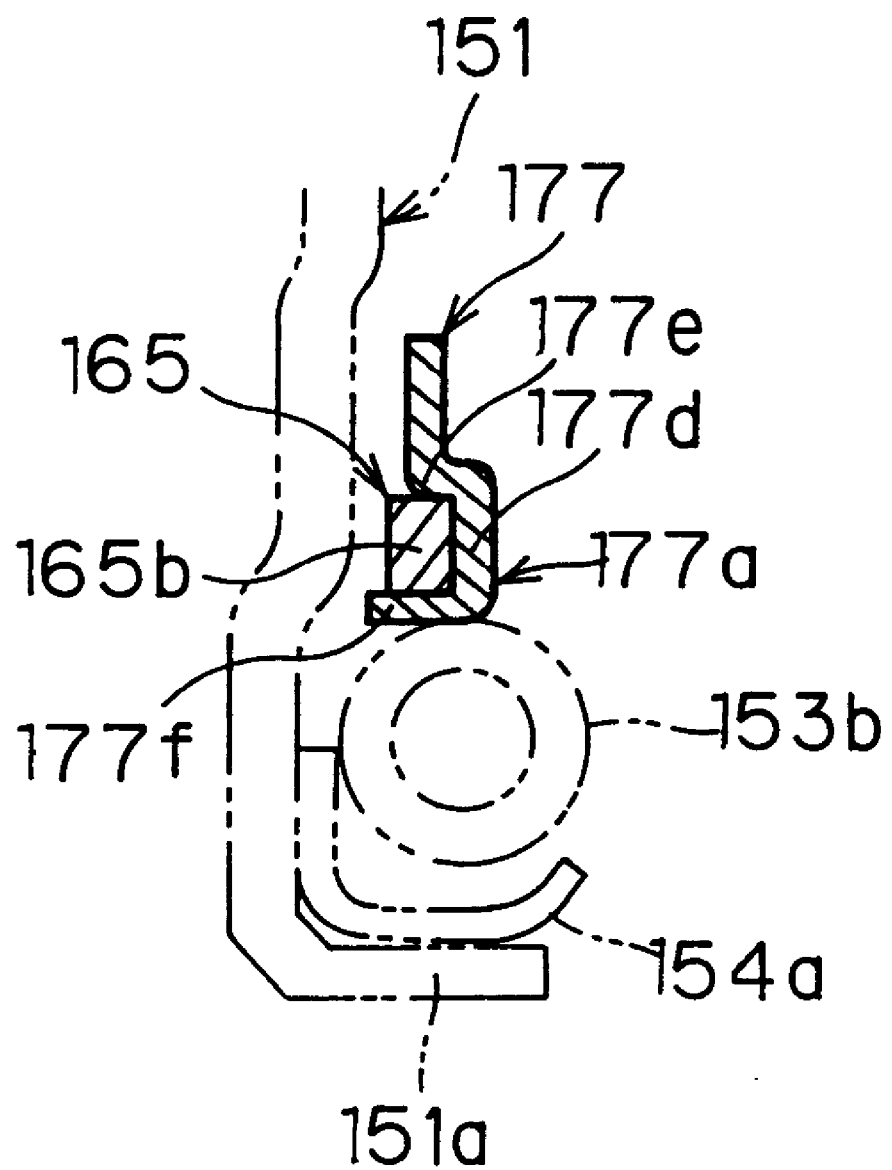
FIG. 17 is a fragmentary cross-sectional view of the intermediate members installed in a lockup mechanism, taken along the line XVII—XVII in FIG. 16.

As shown in FIGS. 16 and 17, four support members 177 are used for supporting the arcuate plates 165b of the intermediate plate 165 so as to be rotatable relative to the shaft of the lockup damper 150 relative to the piston member 151 and the retaining plate 154 and for limiting the axial and radial movements of the intermediate plate 165. Each support member 177 is an arcuate member which is provided with two support portions 177a, a single first hole 177b and two second holes 177c. As shown in FIG. 17, each support portion 177a is composed of an axial support portion 177d and radial support portions 177e and 177f.

The radial support portions 177e and 177f are in contact with the inner circumferential surface and the outer circumferential surface of the arcuate plate 165b of the intermediate plate 165 or face these surfaces with a predetermined gap to thereby limit the radial movement of the intermediate plate 165. The axial support portion 177d is in contact with the output side surface of the arcuate plate 165b or faces it with a predetermined gap to thereby limit the axial movement of the intermediate plate 165 on the output side. On the other hand, the surface, on the input side, of the arcuate plate 165b of the intermediate plate 165 is in contact with or face the retaining plate 154 to thereby limit the axial movement of the intermediate plate 165 on the input side. Incidentally, the support member 177 is mounted on the piston member 151 by rivets 159 passing the second holes 177c and the rivet 160 passing the first hole 177b.

The operation will now be described.

When the twist vibrations are fed to the front cover 103 during the operation of the lockup mechanism, the piston member 151 and the driven member 152 are periodically rotated relative to each other, so that the coil springs 153 are expanded and compressed and in the circumferential direction. In this case, the compressed coil springs 153 are likely to be expanded radially outwardly and to be moved radially outwardly by the centrifugal force. However, since the joint portions of the coil springs 153 are supported to the intermediate support portions 165a of the intermediate plates 165, and the radial movement of the intermediate support portions 165a is limited by the support members 177, the joint portions are hardly moved radially outwardly. As a result, the sliding movements of the joint portions of the coil springs 153 and the outer circumferential bent portions 154a are suppressed. The frictional resistance generated between the coil spring 153 and the outer circumferential bent portion 154a is reduced, thereby enhancing the lockup damper characteristics, in particular, the minute twist vibration absorbing characteristics.

Also, in the lockup damper 150 according to this embodiment, the axial movement of the intermediate plates 165 is limited by the support members 177 and the retaining plate 154. Accordingly, the axial positions of the joint portions of the coil springs 153 supported by the intermediate plates 165 and the intermediate support portions 165a are stabilized in the lockup damper 150. For this reason, when the coil springs 153 are repeatedly expanded and compressed, the interferences of the joint portions of the coil springs 153 and the intermediate plates 165 with the other member and the extra frictional resistance caused by the sliding movement of the joint portions of the coil springs 153 and the intermediate plates 165 relative to the other member are suppressed. Thus, in this embodiment, the characteristics of the lockup damper 150 is stabilized.

According to the present invention, in the lockup damper for the torque convertor having the elastic members connected and disposed in series, since the intermediate limit portions extending in the interior of the coil springs are provided in the intermediate member, the radially outward movements of the elastic members are limited and frictional resistance between the elastic members and the other members is reduced. Also, since the intermediate limit portions serve as stoppers, the loads to be imposed on the elastic members are reduced so that the selection range of the elastic members is broadened on a design.

Also, according to another aspect of the invention, in a damper mechanism in which in order to maintain the angular twist characteristics, two or more elastic members connected in series with each other through the intermediate members are arranged on the outer circumferential portion, the axial movement limit members or the support members are used to thereby limit the movement of the joint portions of the elastic members including the intermediate members and to stabilize the damper characteristics.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A lockup damper included in a lockup mechanism for a torque convertor for mechanically transmitting torque from an input rotary member to an output rotary member and for absorbing and attenuating vibrations transmitted from the input rotary member to the output rotary member, the lockup damper comprising:

an input member selectively engagable with an input rotary member;

an output member connected to an output rotary member of a torque convertor;

a first coil spring functionally disposed between said input member and said output member;

a second coil spring functionally disposed between said first coil spring and said output member; and an intermediate member having an annular ring and at least one intermediate support portion extending from an outer periphery of said annular ring, said intermediate support portion extending between said first coil spring and said second coil spring contacting each of said first coil spring and said second coil spring in a circumferential direction, said intermediate member having an integral intermediate limit portion extending from said intermediate support portion into an interior of at least one of said first and said second coil springs for limiting a radially outward movement of at least one of said first and said second coil springs, wherein said first and second coil springs are disposed adjacent to said outer periphery of said annular ring.

2. The lockup damper according to claim 1, wherein said intermediate limit portion extends from said intermediate support portion into at least a mid-portion of one of said first coil spring and said second coil spring with respect to a circumferential direction of the torque convertor.

3. The lockup damper according to claim 1, wherein:

said second coil spring has a rigidity lower than said first coil spring and said intermediate limit portion extends into said second coil spring said intermediate limit portion is formed with a circumferential length such that in response to compression of said second coil spring beyond a predetermined limit, a distal end of said intermediate limit portion engages a seat member disposed at one end of said second coil spring adjacent to at least one of said input member and said output member thus limiting compression of said second coil spring.

4. The lockup damper according to claim 1, wherein:

said intermediate limit portion comprises a first intermediate limit portion and a second intermediate limit portion, said first intermediate limit portion extending into said first coil spring and said second intermediate limit portion extending into said second coil spring, said first intermediate limit portion is formed with a circumferential length such that in response to compression of said first coil spring beyond a predetermined limit, a distal end of said first intermediate limit portion engages a portion of at least one of said input member and said output member thus limiting compression of said first coil spring, and said second intermediate limit portion is formed with a circumferential length such that in response to compression of said second coil spring beyond a predetermined limit, a distal end of said second intermediate limit portion engages a seat member disposed at one end of said second coil spring adjacent to at least one of said input member and said output member thus limiting compression of said second coil spring.

5. The lockup damper according to claim 4, wherein:

the torque convertor and lockup damper have a forward rotational direction and a reverse rotational direction, said first coil spring is disposed on a forward rotational direction side of said second coil spring;

said intermediate support portion is disposed between a reverse rotational direction side of said first coil spring and said forward rotational direction side of said second coil spring;

said input member includes an input support portion for supporting, in the circumferential direction, a forward rotational direction side of said first coil spring and a reverse rotational direction side of said second coil spring;

said output member includes an output support portion for supporting, in the circumferential direction, said forward rotational direction side of said first coil spring and said reverse rotational direction side of said second coil spring;

seat members are mounted on said forward rotational direction side of said first coil spring and said reverse rotational direction side of said second coil spring; and in response to compression of said first and second coil springs beyond said predetermined limit said intermediate limit portion mechanically engages a corresponding one of said seat members.

6. The lockup damper according to claim 1, wherein:

a plurality of said first and second coil springs and a plurality said intermediate support portions are provided in the torque convertor extending in a circumferential direction therein.

7. A lockup damper included in a lockup mechanism for a torque convertor for mechanically transmitting torque from an input rotary member to an output rotary member and for absorbing and attenuating vibrations transmitted from the input rotary member to the output rotary member, the lockup damper comprising:

an input member selectively engagable with an input rotary member;

an output member connected to an output rotary member of a torque convertor;

a first coil spring and a second coil spring functionally disposed between said input member and said output member on an outer circumferential portion of the torque convertor and connected in series with each other for elastically coupling said input member and said output member with each other in a rotational direction;

an intermediate member having an annular ring and at least one intermediate support portion extending from an outer periphery of said annular ring, said intermediate support portion extending between said first coil spring and said second coil spring contacting each of said first coil spring and said second coil spring in a circumferential direction, said intermediate member having an integral intermediate limit portion extending from said intermediate support portion into an interior of at least one of said first and said second coil springs for limiting a radially outward movement of at least one of said first and said second coil springs; and an axial direction limit member disposed adjacent to said intermediate member to limit movement of said intermediate member in axial directions, wherein said first and second coil springs are disposed adjacent to said outer periphery of said annular ring.

8. The lockup damper according to claim 7, wherein said axial direction limit member is fixed to at least one of said input member and said output member.

9. The lockup damper according to claim 7, wherein said first coil springs have a rigidity that is greater that the rigidity of said second coil springs.

10. A lockup damper included in a lockup mechanism for a torque convertor for mechanically transmitting torque from an input rotary member to an output rotary member and for absorbing and attenuating vibrations transmitted from the input rotary member to the output rotary member, the lockup damper comprising:

an input member selectively engagable with an input rotary member;

an output member connected to an output rotary member of a torque convertor;

a first coil spring functionally disposed between said input member and said output member;

a second coil spring functionally disposed between said first coil spring and said output member; and an intermediate member disposed within the torque convertor, said intermediate member comprising an annular ring and an intermediate support portion extending from an outer periphery of said annular ring, said intermediate member being relatively rotatable with respect to said input member and said output member, said intermediate support portion extending between said first coil spring and said second coil spring contacting each of said first coil spring and said second coil spring in a circumferential direction, said intermediate member having an integral intermediate limit portion extending from said intermediate support portion into an interior of at least one of said first and said second coil springs for limiting a radially outward movement of at least one of said first and said second coil springs; and a support member disposed adjacent to said intermediate member for limiting a movement of said intermediate member in an axial direction in the lockup damper of the torque convertor, said support member further limiting radial movement of said intermediate member such that said intermediate member may undergo relative rotary displacement relative to said input member and said output member, wherein said first and second coil springs are disposed adjacent to said outer peripheral of said annular ring.

11. The lockup damper according to claim 10, wherein said support member is fixed to at least one of said input member and said output member.

12. The lockup damper according to claim 10, wherein said first coil springs have a rigidity that is greater that the rigidity of said second coil springs.

* * * * *